United States Patent
Katsuta et al.

(10) Patent No.: US 9,709,841 B2
(45) Date of Patent: Jul. 18, 2017

(54) LIQUID CRYSTAL DISPLAY DEVICE

(71) Applicant: Sharp Kabushiki Kaisha, Osaka-shi, Osaka (JP)

(72) Inventors: Shohei Katsuta, Osaka (JP); Tsuyoshi Kamada, Osaka (JP); Hideomi Yui, Osaka (JP); Tsuyoshi Maeda, Osaka (JP); Kazuyoshi Sakuragi, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 14/419,527

(22) PCT Filed: Aug. 5, 2013

(86) PCT No.: PCT/JP2013/071103
§ 371 (c)(1),
(2) Date: Feb. 4, 2015

(87) PCT Pub. No.: WO2014/024814
PCT Pub. Date: Feb. 13, 2014

(65) Prior Publication Data
US 2015/0160507 A1 Jun. 11, 2015

(30) Foreign Application Priority Data
Aug. 10, 2012 (JP) ................. 2012-178704

(51) Int. Cl.
*G02F 1/1335* (2006.01)
*G02B 5/02* (2006.01)

(52) U.S. Cl.
CPC ...... *G02F 1/133504* (2013.01); *G02F 1/1336* (2013.01); *G02F 1/133528* (2013.01); *G02B 5/02* (2013.01); *G02F 2001/133562* (2013.01)

(58) Field of Classification Search
None
See application file for complete search history.

(56) References Cited

U.S. PATENT DOCUMENTS 5,481,385 A * 1/1996 Zimmerman ..... G02F 1/133524
349/62
8,926,157 B2 * 1/2015 Umeda ............ G02F 1/133504
362/606
(Continued)

FOREIGN PATENT DOCUMENTS

| JP | 2002-090527 A | 3/2002 | |
| WO | 2009/044520 A1 | 4/2009 | |
| WO | WO 201315103 A1 * | 10/2013 | ........... G02B 5/3083 |

*Primary Examiner* — Dennis Y Kim
(74) *Attorney, Agent, or Firm* — Keating & Bennett, LLP

(57) ABSTRACT

Provided is a liquid crystal display device in which grayscale inversion when viewing a liquid crystal panel in an oblique direction is suppressed, thereby being excellent in viewing angle characteristics. The liquid crystal display device includes a liquid crystal panel that includes a pair of substrates, a liquid crystal layer disposed between the pair of substrates, and a pair of polarization plates respectively arranged in the liquid crystal layer on a light incident side and a light emission side, an illumination device that is arranged on the light incident side of the liquid crystal panel and emits light toward the liquid crystal panel, and a light diffusion member that is arranged on the light emission side of the liquid crystal panel and causes light emitted from the liquid crystal panel to be diffused in an azimuthal direction viewed from a normal direction of the liquid crystal panel. When the total width of a polar angle when luminance is reduced to $\frac{1}{3}$ of the maximum luminance in characteristics of polar angle luminance of the illumination device is referred to as a $\frac{1}{3}$-total width, the $\frac{1}{3}$-total width of the illumination device is equal to or greater than 60° in the azimuthal direction in which variations in luminance of the illumination device in a polar angle direction are the greatest.

9 Claims, 14 Drawing Sheets

(56) References Cited

U.S. PATENT DOCUMENTS

| | | | |
|---|---|---|---|
| 2002/0080484 A1* | 6/2002 | Moshrefzadeh | G03B 21/625 359/460 |
| 2005/0128579 A1* | 6/2005 | Thomas | B29C 70/745 359/443 |
| 2010/0245736 A1 | 9/2010 | Nishihara et al. | |
| 2010/0283947 A1* | 11/2010 | Nishihara | G02B 17/006 349/112 |
| 2014/0111862 A1* | 4/2014 | Yamamoto | G02F 1/133504 359/599 |
| 2014/0160410 A1* | 6/2014 | Yamamoto | B29D 11/00798 349/112 |
| 2014/0253843 A1* | 9/2014 | Kanno | G02B 5/0242 349/62 |
| 2014/0253844 A1* | 9/2014 | Yamamoto | G02B 6/005 349/64 |
| 2014/0354927 A1* | 12/2014 | Kanno | G02F 1/133504 349/112 |
| 2015/0042934 A1* | 2/2015 | Kanno | G02B 5/00 349/112 |
| 2015/0042935 A1* | 2/2015 | Yamamoto | G02B 5/0231 349/112 |
| 2015/0062491 A1* | 3/2015 | Sakuragi | G02B 5/3083 349/64 |
| 2015/0062492 A1* | 3/2015 | Yamamoto | G02F 1/133524 349/64 |

* cited by examiner (A)

440A (B)

440B (C)

440C (A)

(B)

LIQUID CRYSTAL DISPLAY DEVICE

TECHNICAL FIELD

The present invention relates to a liquid crystal display device.

BACKGROUND ART

A liquid crystal display device is widely used as a display for portable electronic devices including portable telephones, television sets, and personal computers. Generally, the liquid crystal display device exhibits excellent display characteristics when a display screen is viewed from the front. Meanwhile, when a display screen is viewed from an oblique direction, a contrast is degraded and visibility is likely to be deteriorated. Otherwise, there may be an occurrence of grayscale inversion in which brightness is inverted in displaying grayscale. Therefore, various techniques to widen a viewing angle range so as to be able to observe the screen with favorable visibility have been proposed.

For example, PTL 1 discloses a liquid crystal display device including a liquid crystal cell and an optical compensation polarization plate. The optical compensation polarization plate is arranged on at least one side of a light incident side and a light emission side in the liquid crystal cell. The optical compensation polarization plate has a polarization plate, a birefringence layer, and an anisotropic scattering film.

In addition, PTL 2 discloses a liquid crystal display device including a liquid crystal display panel and a light diffusion sheet. The light diffusion sheet is arranged on a light emission side of the liquid crystal display panel. The light diffusion sheet has a low refractive index region and a high refractive index region. The cross-sectional shape of the low refractive index region is approximated to an isosceles triangle. The high refractive index region is arranged around the low refractive index region.

CITATION LIST

Patent Literature

PTL 1: Japanese Unexamined Patent Application Publication No. 2002-90527
PTL 2: International Publication No. 2009/044520

SUMMARY OF INVENTION

Technical Problem

A problem is that variations in luminance in a vertical direction of a screen increase when the aforementioned optical compensation polarization plate is applied to a liquid crystal display device of a twisted nematic (hereinafter, abbreviated to TN) mode. The reason is that molecules of liquid crystal are aligned in a twisted manner in the TN mode liquid crystal display device so that retardation of liquid crystal varies depending on an angle and grayscale observing a screen. In addition, even though the aforementioned light diffusion sheet is arranged on a visible side of the liquid crystal display device, it is not possible to cause light to be sufficiently diffused.

The present invention has been made to solve the above-described problems and aims to provide a liquid crystal display device in which grayscale inversion when viewing a display screen in an oblique direction is suppressed, thereby being excellent in viewing angle characteristics.

Solution to Problem

The present invention provides the following means in order to achieve the above-described object.

(1) That is, a liquid crystal display device according to an aspect of the present invention includes a liquid crystal panel that includes a pair of substrates, a liquid crystal layer disposed between the pair of substrates, and a pair of polarization plates respectively arranged in the liquid crystal layer on a light incident side and a light emission side, an illumination device that is arranged on the light incident side of the liquid crystal panel and emits light toward the liquid crystal panel, and a light diffusion member that is arranged on the light emission side of the liquid crystal panel and causes light emitted from the liquid crystal panel to be diffused in an azimuthal direction viewed from a normal direction of the liquid crystal panel. The light diffusion member includes a base material which is optically transparent, a plurality of light shielding layers which are formed on one surface of the base material, and a light diffusion section which is formed in a region other than a forming region of the light shielding layer on the one surface of the base material. The light diffusion section has a light emission end surface which is in contact with the base material, a light incident end surface which is opposite to the light emission end surface and has an area greater than the area of the light emission end surface, and a reflection surface which is in contact with the light emission end surface and the light incident end surface and reflects light incident from the light incident end surface. A height of the light diffusion section from the light incident end surface to the light emission end surface is greater than a layer thickness of the light shielding layer. When the total width of a polar angle when luminance is reduced to $\frac{1}{3}$ of the maximum luminance in characteristics of polar angle luminance of the illumination device is referred to as a $\frac{1}{3}$-total width, the $\frac{1}{3}$-total width of the illumination device is equal to or greater than 60° in the azimuthal direction in which variations in luminance of the illumination device in a polar angle direction are the greatest.

(2) A liquid crystal display device according to another aspect of the present invention includes a liquid crystal panel that includes a pair of substrates, a liquid crystal layer disposed between the pair of substrates, and a pair of polarization plates respectively arranged in the liquid crystal layer on a light incident side and a light emission side, an illumination device that is arranged on the light incident side of the liquid crystal panel and emits light toward the liquid crystal panel, and a light diffusion member that is arranged on the light emission side of the liquid crystal panel and causes light emitted from the liquid crystal panel to be diffused in an azimuthal direction viewed from a normal direction of the liquid crystal panel. The light diffusion member includes a base material which is optically transparent, a plurality of light diffusion sections which are formed on one surface of the base material, and a light shielding layer which is formed in a region other than a forming region of the light diffusion section on the one surface of the base material. The light diffusion section has a light emission end surface which is in contact with the base material, a light incident end surface which is opposite to the light emission end surface and has an area greater than the area of the light emission end surface, and a reflection surface which is in contact with the light emission end surface and the light incident end surface and reflects light incident from the light incident end surface. A height of the light diffusion section from the light incident end surface to the light emission end surface is greater than a layer thickness of the light shielding layer. When the total width of a polar angle when luminance is reduced to ⅓ of the maximum luminance in characteristics of polar angle luminance of the illumination device is referred to as a ⅓-total width, the ⅓-total width of the illumination device is equal to or greater than 60° in the azimuthal direction in which variations in luminance of the illumination device in a polar angle direction are the greatest.

(3) In the liquid crystal display device according to (1) or (2), the azimuthal direction in which variations in luminance of the illumination device in a polar angle direction are the greatest may substantially match an azimuthal direction in which variations in transmittance in the polar angle direction are the greatest when a constant voltage is applied to the liquid crystal panel.

(4) In the liquid crystal display device according to any one of (1) to (3), the ⅓-total width of the illumination device may be equal to or greater than 90° in an azimuthal direction in which variations in luminance of the illumination device in the polar angle direction are the least.

(5) In the liquid crystal display device according to any one of (1) to (4), the light diffusion member may cause light emitted from the liquid crystal panel to be anisotropically diffused in the azimuthal direction viewed from the normal direction of the liquid crystal panel so as to control a light-emitting direction.

(6) In the liquid crystal display device according to (5), the azimuthal direction in which diffusibility of the light diffusion member is the greatest may substantially match the azimuthal direction in which variations in transmittance in the polar angle direction are the greatest when a constant voltage is applied to the liquid crystal panel.

(7) In the liquid crystal display device according to (1), a planar shape of a portion in which the light shielding layer is in contact with the one surface of the base material may be an anisotropic shape having at least a long axis and a short axis.

(8) In the liquid crystal display device according to (7), the planar shape of the portion in which the light shielding layer is in contact with the one surface of the base material may be elliptical or rectangular.

(9) In the liquid crystal display device according to (7) or (8), a short axis direction of the light shielding layer may substantially match the azimuthal direction in which variations in transmittance in the polar angle direction are the greatest when a constant voltage is applied to the liquid crystal panel.

(10) In the liquid crystal display device according to any one of (7) to (9), the ratio B1/B2 between a length B1 in a long-axis direction and a length B2 in the short axis direction in the light shielding layer may be 1.1 or more and 2.5 or less.

(11) In the liquid crystal display device according to any one of (1) to (10), a ratio S1/S2 between an area S1 which is the forming region of the light shielding layer viewed from the normal direction of the base material and an area S2 which is the one surface of the base material may be 0.1 or more and 0.4 or less.

(12) In the liquid crystal display device according to any one of (1) to (11), a display mode of the liquid crystal panel may be a twisted-nematic mode.

(13) In the liquid crystal display device according to any one of (1) to (12), a domain structure of the liquid crystal panel may be a monodomain structure or a multi-domain structure.

(14) In the liquid crystal display device according to any one of (1) to (13), a light scattering member which scatters incident light may be provided on the light emission side of the light diffusion member.

Advantageous Effects of Invention

According to the aspects of the present invention, it is possible to provide a liquid crystal display device in which grayscale inversion when viewing a display screen in an oblique direction is suppressed, thereby being excellent in viewing angle characteristics.

DESCRIPTION OF EMBODIMENTS

First Embodiment

Hereinafter, a first embodiment of the present invention will be described with reference to FIG. 1 to FIGS. 11(A) to 11(D).

In the present embodiment, a description will be given by exemplifying a liquid crystal display device including a transmissive liquid crystal panel.

Throughout the overall drawings below, some configuration elements may be shown in a different scale of dimensions in order to make the configuration element be easily recognized.

Figure 1:
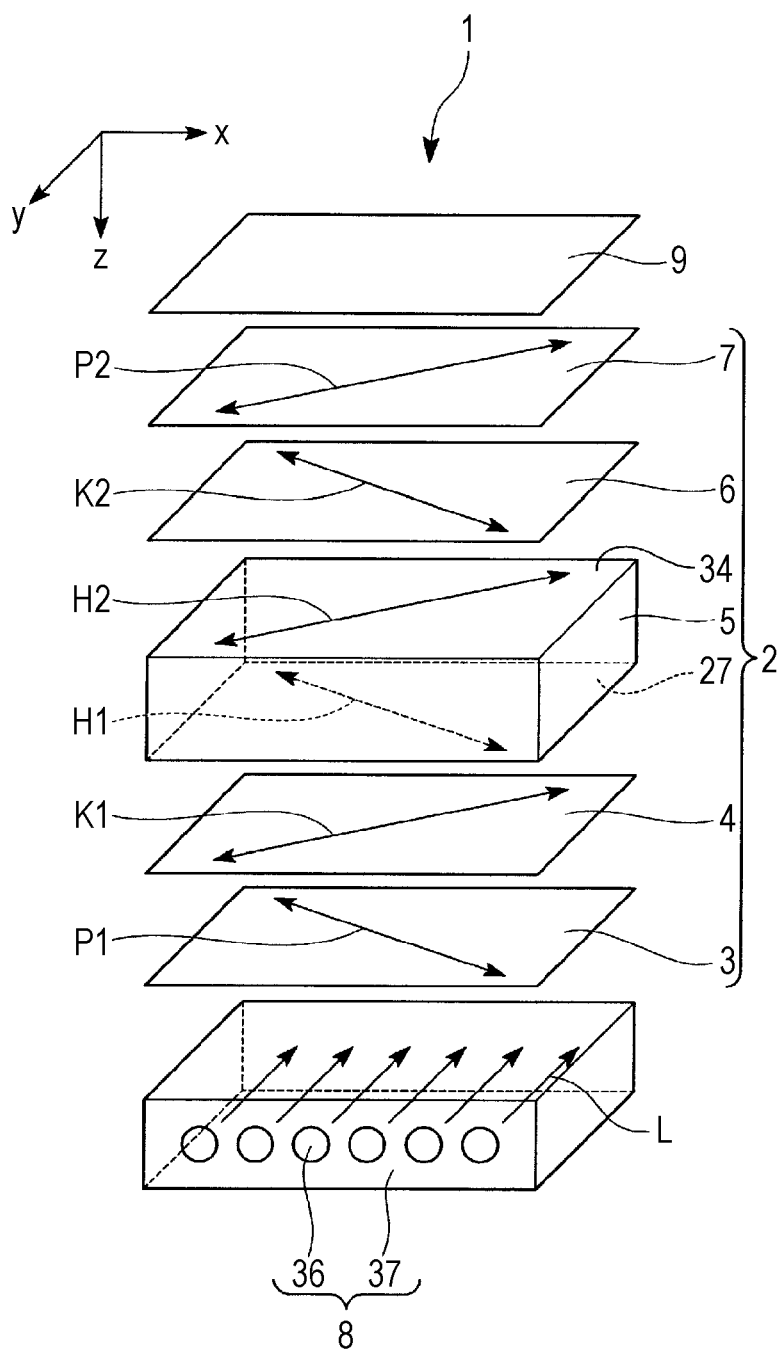
FIG. 1 is a perspective view showing a schematic configuration of a liquid crystal display device of a first embodiment.
Figure 2:
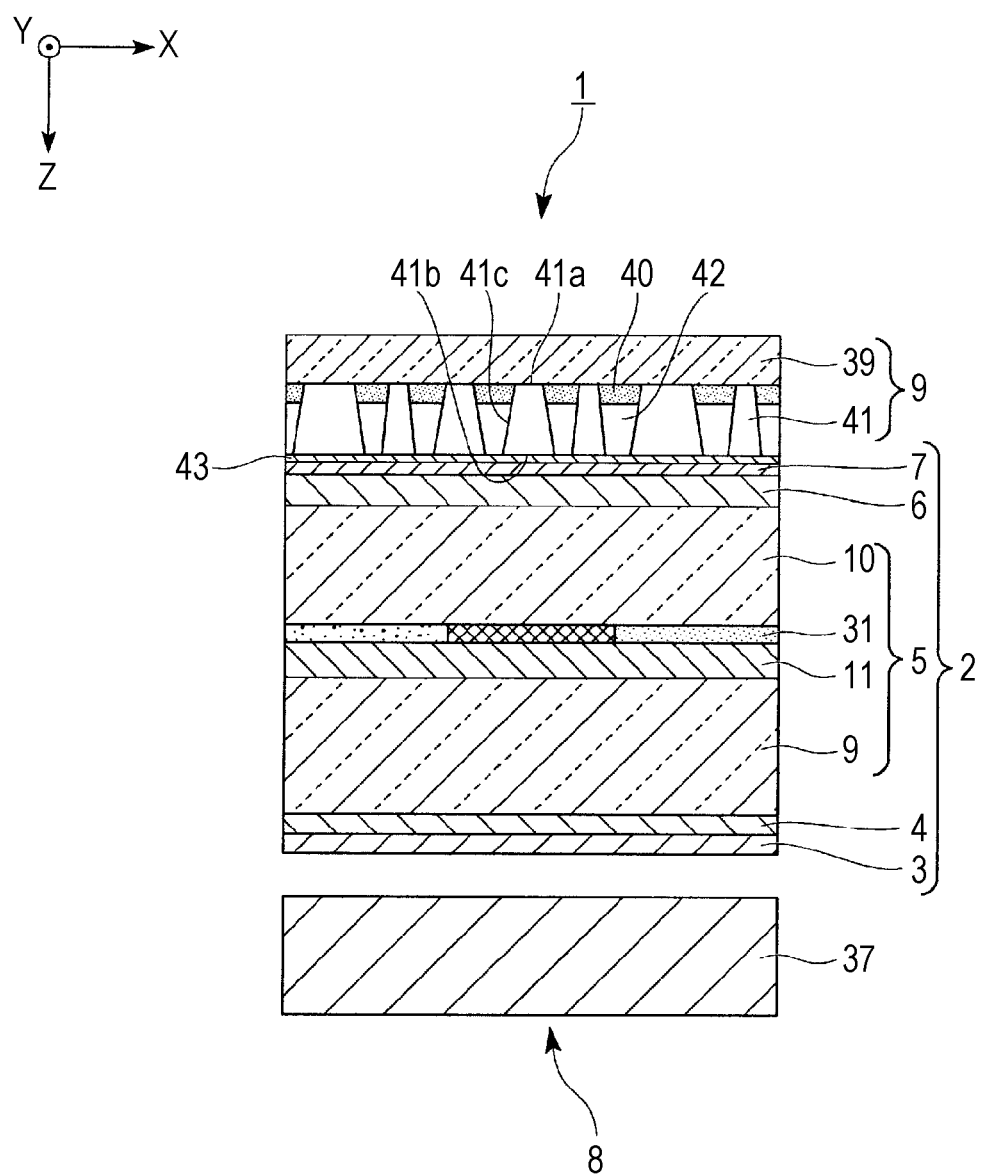
FIG. 2 is a cross-sectional view of the liquid crystal display device.

FIG. 1 is a perspective view of the liquid crystal display device of the present embodiment viewed from obliquely above (visible side). FIG. 2 is a cross-sectional view of the liquid crystal display device.

As shown in FIGS. 1 and 2, a liquid crystal display device 1 of the present embodiment includes a liquid crystal panel 2, a backlight 8 (an illumination device), and a light diffusion member 9. The liquid crystal panel 2 includes a first polarization plate 3, a first retardation film 4 (a retardation plate), a liquid crystal cell 5, a second retardation film 6 (a retardation plate), and a second polarization plate 7. In FIG. 1, the liquid crystal cell 5 is schematically illustrated in one plate-like sheet, and the detailed structure thereof will be described later.

An observer sees a display from above the liquid crystal display device 1 (FIG. 1) in which the light diffusion member 9 is arranged. In the description hereinafter, a side on which the light diffusion member 9 is arranged is referred to as the visible side, and a side on which the backlight 8 is arranged is referred to as a rear surface side. In addition, in the description hereinafter, an X-axis is defined to be a horizontal direction of a screen of the liquid crystal display device, a Y-axis is defined to be a vertical direction of the screen of the liquid crystal display device, and a Z-axis is defined to be a thickness direction of the liquid crystal display device.

In the liquid crystal display device 1 of the present embodiment, light emitted from the backlight 8 is modulated in the liquid crystal panel 2, thereby displaying predetermined images and characters by the modulated light. When light emitted from the liquid crystal panel 2 is transmitted through the light diffusion member 9, luminous distribution of the emitted light is in a widened state compared to that before being incident on the light diffusion member 9, and then, the light is emitted from the light diffusion member 9. Accordingly, an observer can visually recognize a display in a wide viewing angle.

Hereinafter, a description will be given regarding a specific configuration of the liquid crystal panel 2.

In this case, an active matrix-type transmissive liquid crystal panel will be described as an example. However, a liquid crystal panel applicable to the present invention is not limited to the active matrix-type transmissive liquid crystal panel. The liquid crystal panel applicable to the present invention may be a transflective (transmissive-reflective type) liquid crystal panel, for example. Moreover, the liquid crystal panel may be a simple matrix-type liquid crystal panel in which a thin film transistor (hereinafter, abbreviated to TFT) for switching is not included in each pixel.

Figure 3:
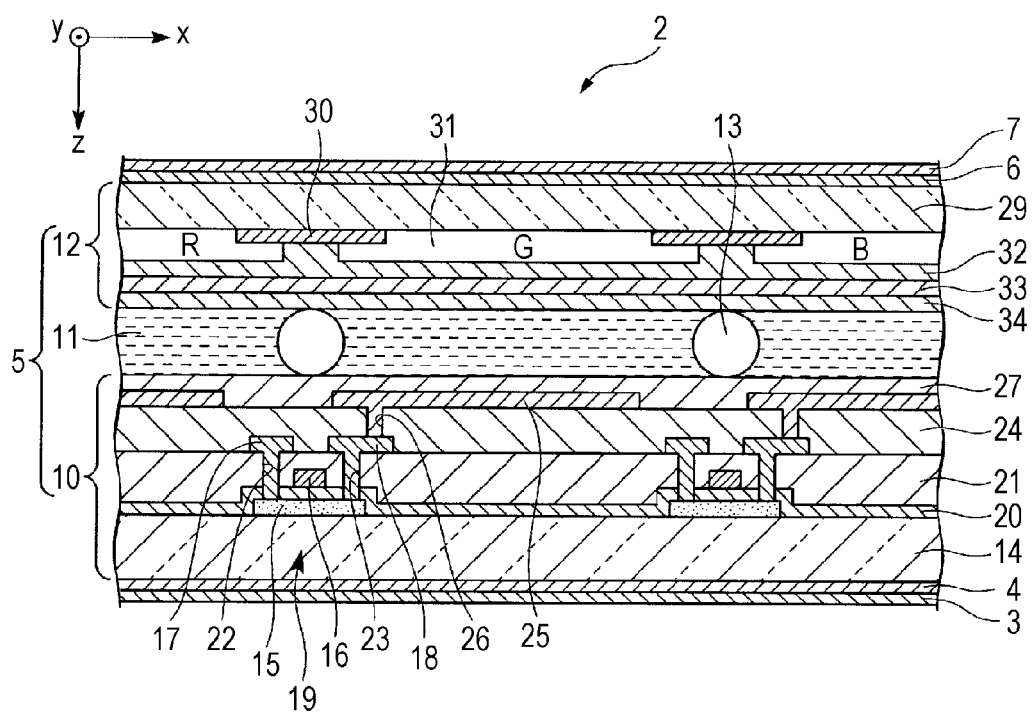
FIG. 3 is a longitudinal sectional view of a liquid crystal panel.

FIG. 3 is a longitudinal sectional view of the liquid crystal panel 2.

As shown in FIG. 3, the liquid crystal cell 5 has a TFT substrate 10, a color filter substrate 12, and a liquid crystal layer 11. The TFT substrate 10 functions as a switching element substrate. The color filter substrate 12 is arranged to be opposite to the TFT substrate 10. The liquid crystal layer 11 is disposed between the TFT substrate 10 and the color filter substrate 12.

The liquid crystal layer 11 is sealed in a space fixed by the TFT substrate 10, the color filter substrate 12, and a frame-like sealing member (not illustrated). The TFT substrate 10 and the color filter substrate 12 are bonded by the sealing member at a predetermined interval.

The liquid crystal panel 2 of the present embodiment performs displaying in a twisted-nematic (TN) mode, for example.

The liquid crystal layer 11 employs liquid crystal of which dielectric anisotropy is positive. A spacer 13 is arranged between the TFT substrate 10 and the color filter substrate 12. The spacer 13 has a spherical shape or a columnar shape. The spacer 13 uniformly maintains the interval between the TFT substrate 10 and the color filter substrate 12.

The display mode of the liquid crystal panel 2 of the present invention is not limited to the above-described TN mode. For example, a vertical alignment (VA) mode, a super twisted-nematic (STN) mode, an in-plane switching (IPS) mode, and a fringe field switching (FFS) mode may be used because grayscale inversion may also occur in the aforementioned display modes depending on a rubbing direction of an alignment membrane when a display image is obliquely viewed.

A plurality of pixels are arranged in the TFT substrate 10 in a matrix form (not illustrated). The pixel is a minimum unit region for the display. A plurality of source bus lines are formed in the TFT substrate 10 so as to extend to be parallel to one another. A plurality of gate bus lines are formed in the TFT substrate 10 so as to extend to be parallel to one another. The plurality of gate bus lines intersect with the plurality of source bus lines. The plurality of source bus lines and the plurality of gate bus lines are formed in a lattice shape on the TFT substrate 10. A rectangular region partitioned by adjacent source bus lines and adjacent gate bus lines forms one pixel. The source bus line is coupled to a source electrode 17 of a TFT 19. The gate bus line is coupled to a gate electrode 16 of the TFT 19.

The TFT 19 having a semiconductor layer 15, the gate electrode 16, the source electrode 17, and the drain electrode 18 is formed on a surface of a transparent substrate 14 on the liquid crystal layer 11 side configuring the TFT substrate 10. A glass substrate can be used as the transparent substrate 14, for example.

The semiconductor layer 15 is formed on the transparent substrate 14. Semiconductor materials such as continuous grain silicon (CGS), low-temperature poly-silicon (LPS), and amorphous silicon (α-Si) are used as a material for the semiconductor layer 15, for example.

A gate insulating membrane 20 is formed on the transparent substrate 14 so as to cover the semiconductor layer 15. A silicon oxide membrane, a silicon nitride membrane, or a stacked membrane thereof is used as a material for the gate insulating membrane 20, for example.

The gate electrode 16 is formed on the gate insulating membrane 20 so as to be opposite to the semiconductor layer 15. A stacked membrane of tungsten (W)/tantalum nitride (TaN), molybdenum (Mo), titanium (Ti), and aluminum (Al) is used as a material for the gate electrode 16, for example.

A first interlayer membrane 21 is formed on the gate insulating membrane 20 so as to cover the gate electrode 16. A silicon oxide membrane, a silicon nitride membrane, or a stacked membrane thereof is used as a material for the first interlayer membrane 21, for example.

The source electrode 17 and the drain electrode 18 are formed on the first interlayer membrane 21. A contact hole 22 and a contact hole 23 are formed in the first interlayer membrane 21 and the gate insulating membrane 20 so as to penetrate the first interlayer membrane 21 and the gate insulating membrane 20. The source electrode 17 is coupled to a source region of the semiconductor layer 15 through the contact hole 22. The drain electrode 18 is coupled to a drain region of the semiconductor layer 15 through the contact hole 23. A conductive material similar to that of the above-described gate electrode 16 is used as a material for the source electrode 17 and the drain electrode 18.

A second interlayer membrane 24 is formed on the first interlayer membrane 21 so as to cover the source electrode 17 and the drain electrode 18. A material similar to that of the above-described first interlayer membrane 21 or an organic insulating material is used as a material for the second interlayer membrane 24.

A pixel electrode 25 is formed on the second interlayer membrane 24. A contact hole 26 is formed in the second interlayer membrane 24 so as to penetrate the second interlayer membrane 24. The pixel electrode 25 is coupled to the drain electrode 18 through the contact hole 26. The pixel electrode 25 is coupled to the drain region of the semiconductor layer 15 having the drain electrode 18 as a relay electrode. A transparent conductive material such as indium tin oxide (ITO) and indium zinc oxide (IZO) is used as a material for the pixel electrode 25, for example.

According to the aforementioned configuration, a scanning signal is supplied through the gate bus line, and an image signal supplied to the source electrode 17 through the source bus line is supplied to the pixel electrode 25 via the semiconductor layer 15 and the drain electrode 18 when the TFT 19 is in an On-state. An alignment membrane 27 is formed on an entire surface on the second interlayer membrane 24 so as to cover the pixel electrode 25. The alignment membrane 27 has an alignment regulation force for causing liquid crystal molecules configuring the liquid crystal layer 11 to be horizontally aligned. As the form of the TFT 19, a bottom gate-type TFT shown in FIG. 3 may be adopted, or a top gate-type TFT may be adopted.

Meanwhile, black matrices 30, a color filter 31, a planarization layer 32, a counter electrode 33, and an alignment membrane 34 are sequentially formed on a surface of a transparent substrate 29 on the liquid crystal layer 11 side, configuring the color filter substrate 12.

The black matrix 30 has a function to cut off transmission of light in regions among pixels. The black matrix 30 is formed of metal such as chrome (Cr) or a multi-layer membrane of Cr/chromium oxide, or a photoresist formed by scattering carbon particles on a photosensitive resin, for example.

The color filter 31 includes coloring of each color of red (R), green (G), and blue (B). The color filter 31 for any one of R, G, and B is arranged so as to be opposite to one pixel electrode 25 on the TFT substrate 10. The color filter 31 may have a multicolor configuration including more colors than the RGB tri-color.

The planarization layer 32 is configured with an insulating membrane covering the black matrices 30 and the color filter 31. The planarization layer 32 has a function to alleviate a step difference made by the black matrices 30 and the color filter 31, thereby making the step difference to be planar.

The counter electrode 33 is formed on the planarization layer 32. A transparent conductive material similar to that of the pixel electrode 25 is used as a material for the counter electrode 33.

The alignment membrane 34 is formed on an entire surface on the counter electrode 33. The alignment membrane 34 has an alignment regulation force for causing the liquid crystal molecules configuring the liquid crystal layer 11 to be horizontally aligned.

Returning back to FIG. 1, the backlight 8 includes a light source 36 and a light guide 37. The light source 36 is arranged on an end surface of the light guide 37. For example, a light emitting diode and a cold-cathode tube are used as the light source 36.

The backlight 8 of the present embodiment is an edge light-type backlight.

The light guide 37 has a function to guide light emitted from the light source 36, to the liquid crystal panel 2. A resin material such as an acrylic resin is used as a material for the light guide 37, for example.

Light incident on an end surface of the light guide 37 from the light source 36 spreads inside the light guide 37 while being totally reflected, and the light is emitted from the top surface (a light emission surface) of the light guide 37 at substantially uniform intensity. A scattering sheet and a prism sheet are arranged on the top surface of the light guide 37 (not illustrated). Light emitted from the top surface of the light guide 37 scatters by the scattering sheet. Thereafter, the light is concentrated by the prism sheet and substantially parallelized, thereby being emitted. As the prism sheet, for example, BEF (brand name) manufactured by Sumitomo 3M Limited is used.

A directivity backlight is not used for the backlight 8 of the present embodiment. A backlight in which a light-emitting direction is controlled and directivity is gently configured to some extent (hereinafter, may be referred to as a low directivity backlight) is used as the backlight 8 of the present embodiment. Luminance distribution of the low directivity backlight will be described later.

The first polarization plate 3 is provided between the backlight 8 and the liquid crystal cell 5. The first polarization plate 3 functions as a polarizer. In this case, angles are indicated counterclockwise having the positive direction of an X-axis as a reference. Then, a transmission axis P1 of the first polarization plate 3 is configured to be in a 135°-315° direction.

The second polarization plate 7 is provided between the liquid crystal cell 5 and the light diffusion member 9. The second polarization plate 7 functions as a polarizer. A transmission axis P2 of the second polarization plate 7 is arranged to intersect with the transmission axis P1 of the first polarization plate 3. The transmission axis P2 of the second polarization plate 7 is configured to be in a 45°-225° direction. The transmission axis P1 of the first polarization plate 3 and the transmission axis P2 of the second polarization plate 7 are in a cross-nicol arrangement.

The first retardation film 4 is provided between the first polarization plate 3 and the liquid crystal cell 5. A slow axis K1 of the first retardation film 4 is arranged to intersect with the transmission axis P1 of the first polarization plate 3. The slow axis K1 of the retardation film 4 is configured to be in the 45°-225° direction.

The second retardation film 6 is provided between the second polarization plate 7 and the liquid crystal cell 5. A slow axis K2 of the second retardation film 6 is arranged to intersect with the transmission axis P2 of the second polarization plate 7. The slow axis K2 of the retardation film 6 is configured to be in the 135°-315° direction.

As the retardation films (the first retardation film 4 and the second retardation film 6) of the present embodiment, a WV film manufactured by Fujifilm Corporation is used.

Subsequently, a description will be given in detail regarding the light diffusion member 9.

Figure 4:
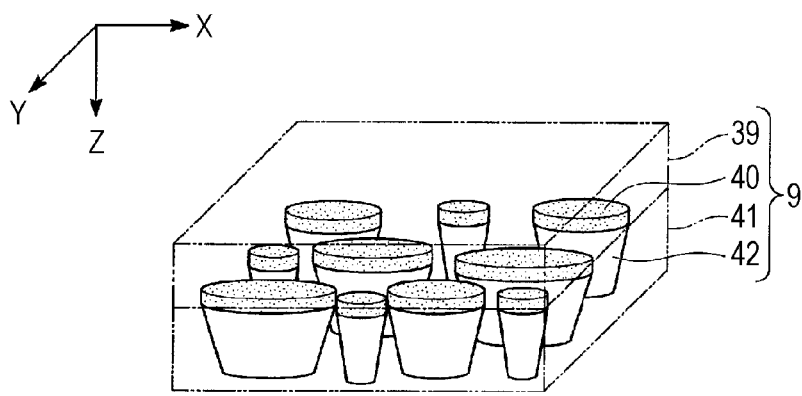
FIG. 4 is a perspective view showing a light diffusion member.

FIG. 4 is a perspective view of the light diffusion member 9 viewed from the visible side.

As shown in FIG. 4, the light diffusion member 9 includes a base material 39, a plurality of light shielding layers 40, and light diffusion sections 41. The plurality of light shielding layers 40 are formed on one surface (a surface on the opposite side of the visible side) of the base material 39. The light diffusion sections 41 are formed in regions other than forming regions of the light shielding layers 40 on one surface of the base material 39.

As shown in FIG. 2, the light diffusion member 9 is arranged on the second polarization plate 7 in a posture causing a side where the light diffusion sections 41 are provided to be oriented toward the second polarization plate 7 and causing the base material 39 side to be oriented toward the visible side. The light diffusion member 9 is fixed to the second polarization plate 7 by interposing an adhesive layer 43 therebetween.

A base material made of transparent resin such as a triacetyl cellulose (TAC) film, polyethylene terephthalate (PET), polycarbonate (PC), polyethylene naphthalate (PEN), and a polyether sulfone (PES) film are preferably used for the base material 39, for example. Through a manufacturing process, the base material 39 becomes a base used when applying materials of the light shielding layers 40 and the light diffusion sections 41 afterward. The base material 39 needs to be heat resistant to endure a heat treatment process and needs to have mechanical strength, during the manufacturing process. Therefore, a glass base material and the like may be used as the base material 39 other than a resin base material. In this case, it is preferable that a thickness of the base material 39 be thin to such an extent so as not to hinder the heat resistant property and mechanical strength because there may be an occurrence of a blur in a display as the thickness of the base material 39 increases. In addition, it is preferable that total light transmittance of the base material 39 be equal to or greater than 90% as regulated in JIS K7361-1. When the total light transmittance is equal to or greater than 90%, sufficient transparency can be achieved. In the present embodiment, as an example, a base material made of transparent resin having a thickness of 100 μm is used.

The light shielding layers 40 are arranged at random when viewed from a normal direction of a main surface of the base material 39. As an example, the light shielding layers 40 are configured with an organic material such as a black resist and black ink which are light-absorbent and photosensitive. Moreover, a metallic membrane such as chrome (Cr) or a multi-layer membrane of chrome/chromium oxide may be used.

For example, the light diffusion sections 41 are configured with an organic material such as an acrylic resin or an epoxy resin which are optically transparent and photosensitive. In addition, it is preferable that total light transmittance of the light diffusion section 41 be equal to or greater than 90% as regulated in JIS K7361-1. When the total light transmittance is equal to or greater than 90%, sufficient transparency can be achieved.

The light diffusion section 41 has a light emission end surface 41a, a light incident end surface 41b, and reflection surfaces 41c. The light emission end surface 41a is a surface that is in contact with the base material 39. The light incident end surface 41b is a surface opposite to the light emission end surface 41a. The reflection surfaces 41c are tapered side surfaces of the light diffusion section 41. The reflection surfaces 41c are surfaces reflecting light incident from the light incident end surface 41b. The area of the light incident end surface 41b is greater than the area of the light emission end surface 41a.

The light diffusion section 41 is a portion contributing to the light diffusion member 9 in transmitting light. That is, light incident on the light diffusion section 41 is totally reflected by the reflection surfaces 41c of the light diffusion section 41, and the light is guided to be emitted in a state of being substantially confined inside the light diffusion section 41.

The light diffusion member 9 is arranged so as to cause the base material 39 to be oriented toward the visible side. Therefore, a surface having a smaller area out of two opposite surfaces of the light diffusion section 41 becomes the light emission end surface 41a. On the other hand, a surface having a greater area becomes the light incident end surface 41b.

It is preferable that a tilt angle (an angle formed by the light incident end surface 41b and the reflection surface 41c) of the reflection surface 41c in the light diffusion section 41 range from 75° to 85°. In the present embodiment, the tilt angle of the reflection surface 41c in the light diffusion section 41 is 85°. However, the tilt angle of the reflection surface 41c in the light diffusion section 41 is not particularly limited as long as incident light can be sufficiently diffused in the angle when being emitted from the light diffusion member 9. In the present embodiment, the tilt angles of the reflection surfaces 41c in the light diffusion sections 41 are uniform.

A height of the light diffusion section 41 from the light incident end surface 41b to the light emission end surface 41a is configured to be greater than the layer thickness of the light shielding layer 40. In the case of the present embodiment, a layer thickness of the light shielding layer 40 is approximately 150 nm, as an example. A height of the light diffusion section 41 from the light incident end surface 41b to the light emission end surface 41a is approximately 20 w, as an example. Portions fixed by the reflection surfaces 41c of the light diffusion section 41, and the light shielding layers 40 are hollow sections 42. Air is present in the hollow sections 42.

It is desirable that a refractive index of the base material 39 be substantially equivalent to a refractive index of the light diffusion section 41. The reason thereof is as follows. For example, when considering a case where the refractive index of the base material 39 is greatly different from the refractive index of the light diffusion section 41, there may be an occurrence of refraction or reflection of unnecessary light in an interface between the light diffusion section 41 and the base material 39 when light incident from the light incident end surface 41b is emitted from the light diffusion section 41. In this case, there may be an occurrence of a disadvantage such that a desired viewing angle cannot be obtained, quantity of emitted light is reduced, and the like.

In the case of the present embodiment, air is present in the hollow sections 42 (external portions of the light diffusion sections 41). Therefore, when the light diffusion section 41 is formed of a transparent acrylic resin, for example, the reflection surfaces 41c of the light diffusion section 41 form an interface between the transparent acrylic resin and air. In this case, the hollow sections 42 may be filled with a refractive index material. However, the difference of the refractive indexes in the interface between the internal portion and the external portion of the light diffusion section 41 becomes the maximum when air is present compared to a case where any and every low refractive index material is present in the external portion. According to Snell's law, a critical angle becomes the smallest in the present embodiment, and an incident angle range in which light is totally reflected by the reflection surfaces 41c of the light diffusion section 41 becomes the widest. As a result, a loss of light is further suppressed, and thus, high luminance can be achieved.

Figure 5:
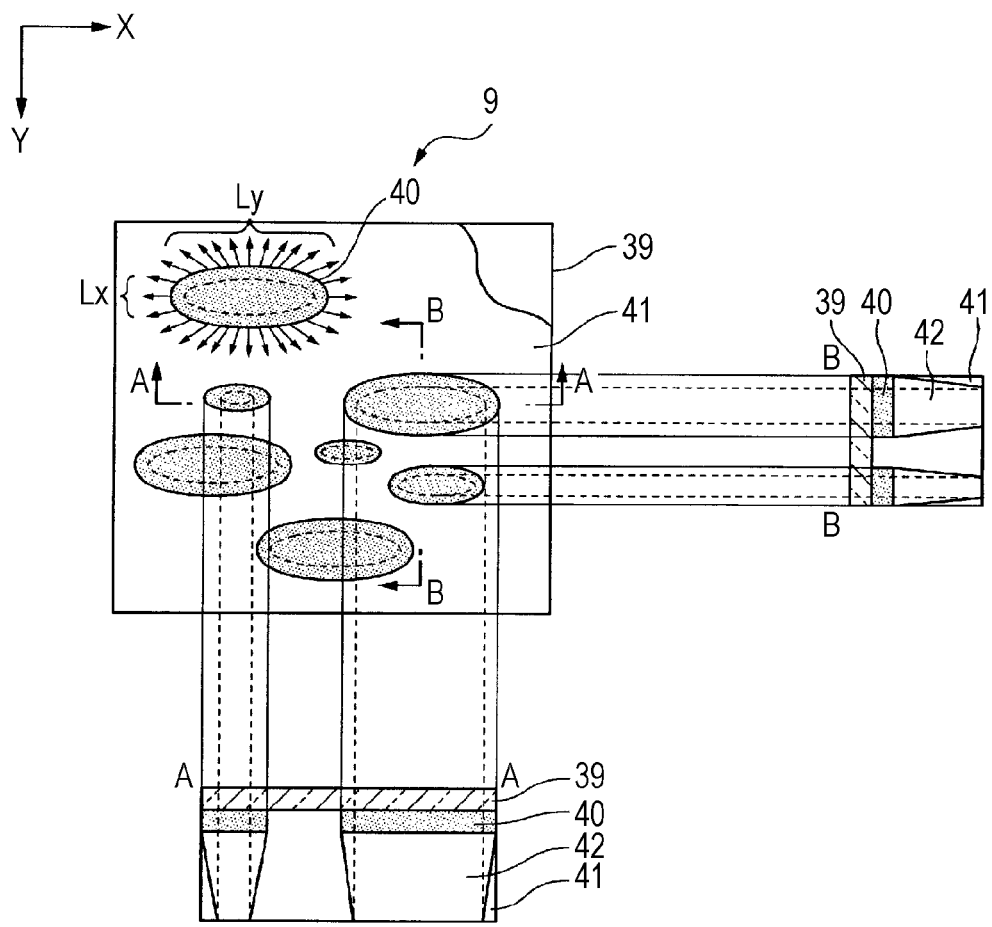
FIG. 5 is a plan view of the light diffusion member.

FIG. 5 is a schematic view of the light diffusion member 9. In FIG. 5, the diagram on the upper left side is a plan view of the light diffusion member 9. The diagram on the lower left side is a cross-sectional view taken along line A-A of the plan view on the upper left side. The diagram on the upper right side is a cross-sectional view taken along line B-B of the plan view on the upper left side.

As shown on the upper left side in FIG. 5, in the light diffusion member 9 of the present embodiment, the plurality of light shielding layers 40 are provided to be interspersed on the one surface of the base material 39. A planar shape of the light shielding layer 40 viewed from the normal direction of the base material 39 is an elongated elliptical shape. The light shielding layer 40 has a long axis and a short axis. Here, the long axis indicates an axis having the longest length in the planar shape of the light shielding layer 40 viewed from the normal direction of the base material 39. The short axis indicates an axis having the shortest length in the planar shape of the light shielding layer 40 viewed from the normal direction of the base material 39. In the light diffusion member 9 of the present embodiment, a ratio of the length of the short axis to the length of the long axis is substantially the same in each of the light shielding layers 40.

An area of a forming region of the light shielding layer 40 viewed from the normal direction of the base material 39 is referred to as S1. An area of the one surface of the base material 39 is referred to as S2. A ratio S1/S2 between the area S1 of the forming region of the light shielding layer 40 and the area S2 of the one surface of the base material 39 ranges from 0.1 to 0.4. In this case, the area of the forming region of the light shielding layer 40 indicates an area of the total region in which all the forming regions of the plurality of light shielding layers 40 provided to be interspersed in the one surface of the base material 39 are added. In the descriptions hereinafter, the ratio S1/S2 between the area S1 of the forming region of the light shielding layer 40 and the area S2 of the one surface of the base material 39 may be simply referred to as an area ratio in the forming region of the light shielding layer 40. In the present embodiment, the area ratio S1/S2 between the forming regions of the light shielding layer 40 is 0.3.

As shown in FIG. 5 on the lower left side and the upper right side, a portion corresponding to a lower portion of the light shielding layer 40 is the hollow section 42 having an elliptical frustum shape. The light diffusion member 9 has a plurality of the hollow sections 42. The light diffusion sections 41 are provided to be clustered in portions other than the plurality of hollow sections 42.

In the light diffusion member 9 of the present embodiment, a long axis direction of an ellipse forming the planar shape of each light shielding layer 40 (hereinafter, may be referred to as the long axis direction of the light shielding layer) substantially matches an X-direction, and a short axis direction of the ellipse forming the planar shape of each light shielding layer 40 (hereinafter, may be referred to as the short axis direction of the light shielding layer) substantially matches a Y-direction. Accordingly, when considering an orientation of the reflection surface 41c in the light diffusion section 41, a ratio of the reflection surface 41c along the X-direction out of the reflection surfaces 41c of the light diffusion section 41 is greater than a ratio of the reflection surface 41c along the Y-direction. Therefore, light Ly which is reflected by the reflection surface 41c along the X-direction and is diffused in the Y-direction is greater than light Lx which is reflected by the reflection surface 41c along the Y-direction and is diffused in the X-direction. Accordingly, an azimuthal direction in which diffusibility of the light diffusion member 9 is the greatest is the Y-direction which is the short axis direction of the light shielding layer 40.

The planar shape of the light shielding layer 40 may include a circular shape, a polygon shape, a semicircular shape, and the like. In addition, portions of the light shielding layers 40 may be formed to overlap each other.

Figure 6:
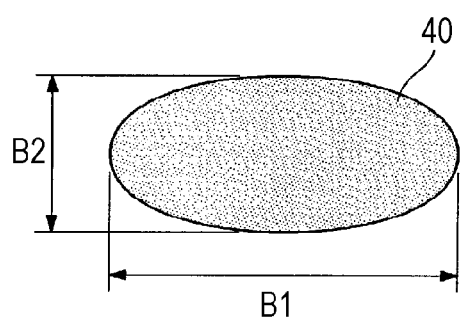
FIG. 6 is a diagram for describing a size of a light shielding layer in a plan view.
Figure 7:
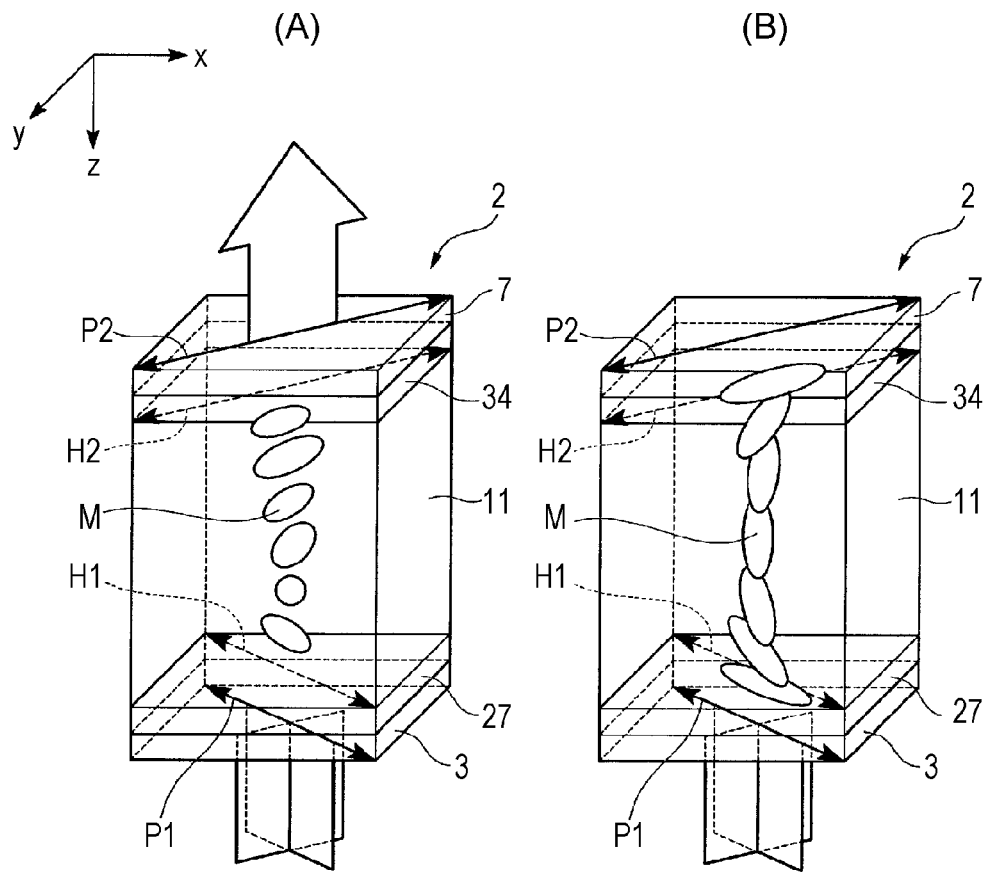
FIG. 7 includes diagrams (A) and (B) for describing operations of the liquid crystal panel.

FIG. 6 is a diagram for describing a size of the light shielding layer 40 in a plan view.

FIG. 6 is a plan view showing one light shielding layer 40 out of the plurality of light shielding layers 40.

As shown in FIG. 6, a length of the light shielding layer 40 in the long axis direction is referred to as B1, and a length of the light shielding layer 40 in the short axis direction is referred to as B2. It is preferable that a ratio B1/B2 between the length B1 of the light shielding layer 40 in the long axis direction and the length B2 thereof in the short axis direction range from 1.1 to 2.5.

In the present embodiment, the length B1 of the light shielding layer 40 in the long axis direction is 20 w, and the length B2 of the light shielding layer 40 in the short axis direction is 10 μm. The ratio B1/B2 between the length B1 of the light shielding layer 40 in the long axis direction and the length B2 thereof in the short axis direction is 2.

Returning back to FIG. 1, an alignment controlling direction of the alignment membrane 27 of the TFT substrate 10 is indicated by the arrow H1. Meanwhile, an alignment controlling direction of the alignment membrane 34 of the color filter substrate 12 is indicated by the arrow H2.

Alignment treatment such as rubbing is performed in the alignment membrane 27 so as to cause the alignment controlling direction H1 to be the 135°-315° direction. Meanwhile, alignment treatment such as rubbing is performed in the alignment membrane 34 so as to cause the alignment controlling direction H2 to be the 45°-225° direction.

FIGS. 7(A) and 7(B) are diagrams for describing operations of the liquid crystal panel 2.

FIG. 7(A) is a diagram showing a state where a voltage is not applied (when no voltage is applied) to the liquid crystal panel 2 (between the pixel electrode 25 and the counter electrode 33 shown in FIG. 3). FIG. 7(B) is a diagram showing a state where a constant voltage is applied (when a voltage is applied) to the liquid crystal panel 2. In FIGS. 7(A) and 7(B), the first retardation film 4 and the second retardation film 6 will not be illustrated, for convenience. The reference sign M indicates a liquid crystal molecule configuring the liquid crystal layer 11.

When no voltage is applied, the liquid crystal molecule M is in a 90°-twisted state between the alignment membrane 27 and the alignment membrane 34, as shown in FIG. 7(A). In this case, a polarization surface of linearly polarized light which is transmitted through the first polarization plate 3 having the transmission axis P1 in the 135°-315° direction rotates 90° due to optical rotation by the liquid crystal layer 11. Accordingly, the linearly polarized light which is transmitted through the first polarization plate 3 is transmitted through the second polarization plate 7 having the transmission axis P2 in the 45°-225° direction. As a result, white is displayed when no voltage is applied.

When a voltage is applied, the liquid crystal molecules M are in an erected state between the alignment membrane 27 and the alignment membrane 34 in a direction along an electric field, as shown in FIG. 7(B). In this case, the polarization surface of linearly polarized light which is transmitted through the first polarization plate 3 having the transmission axis P1 in the 135°-315° direction does not rotate. Therefore, the linearly polarized light which is transmitted through the first polarization plate 3 is not transmitted through the second polarization plate 7 having the transmission axis P2 in the 45°-225° direction. As a result, black is displayed when a voltage is applied.

As described above, the white display and the black display are switched by controlling the application/no application of a voltage for each pixel, thereby making it possible to display an image.

Incidentally, as described below, a contrast ratio of a display image varies depending on a viewing angle.

Figure 8:
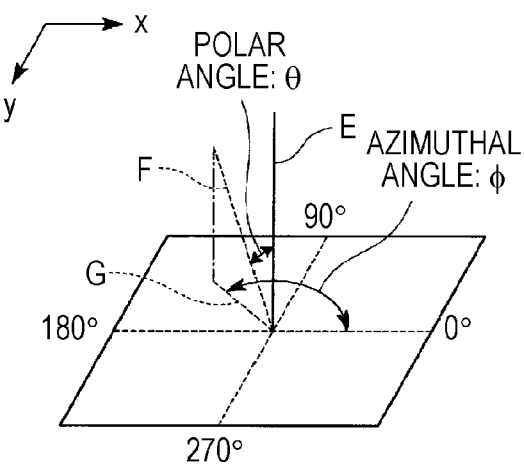
FIG. 8 is a diagram for describing definitions of a polar angle and an azimuthal angle.

FIG. 8 is a diagram for describing definitions of a polar angle and an azimuthal angle.

Here, as shown in FIG. 8, an angle formed by a visual line direction F of an observer having a normal direction E of a screen of the liquid crystal display device 1 as the reference is referred to as a polar angle θ. An angle formed by a direction of a line segment G having the positive direction of the X-axis (a 0°-direction) as a reference when the visual line direction F of an observer is projected onto the screen is referred to as an azimuthal angle φ.

Figure 9:
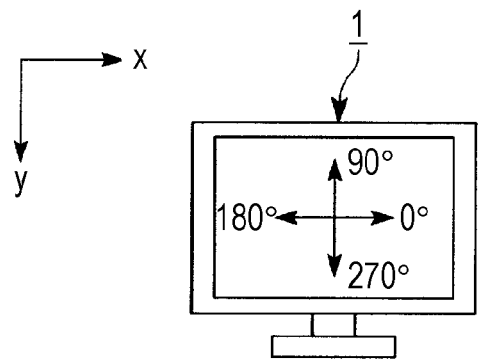
FIG. 9 is a front view of the liquid crystal display device.

FIG. 9 is a front view of the liquid crystal display device 1.

As shown in FIG. 9, the horizontal direction (an X-axis direction) in the screen of the liquid crystal display device 1 is referred to as an azimuthal angle φ: 0°-180° direction. In brief, the azimuthal angle φ: 0°-180° direction is a lateral direction. Specifically, the azimuthal angle φ: 0°-180° direction is a direction along an axis horizontal to the ground. The vertical direction (a Y-axis direction) is referred to as an azimuthal angle φ: 90°-270° direction. In brief, the azimuthal angle φ: 90°-270° direction is an up-down direction. Specifically, the azimuthal angle φ: 90°-270° direction is a direction along an axis perpendicular to the ground.

When the azimuthal direction is defined as shown in FIG. 9, variations in transmittance at an azimuthal angle φ: 270° direction when a constant voltage is applied to a liquid crystal panel are the greatest in the liquid crystal display device disclosed in PTL 1. Therefore, there has been a problem in that visibility of a display image is degraded when the display image is observed from a side in the azimuthal angle φ: 270° direction.

Accordingly, the present embodiment employs the following configuration in which visibility of a display image can be maintained in a favorable state even though the display image is observed from a side in the azimuthal angle φ: 270° direction.

Figure 10:
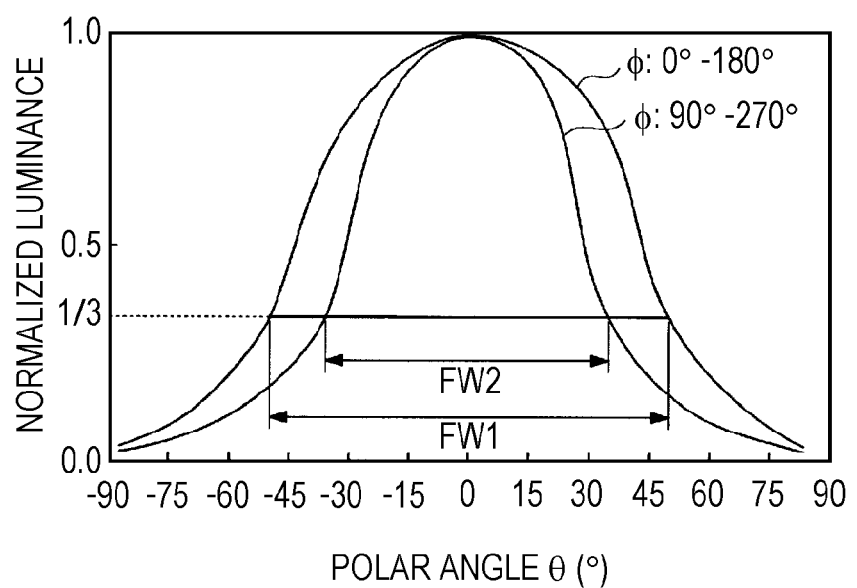
FIG. 10 is a diagram showing characteristics of polar angle luminance of a backlight.
Figure 11:
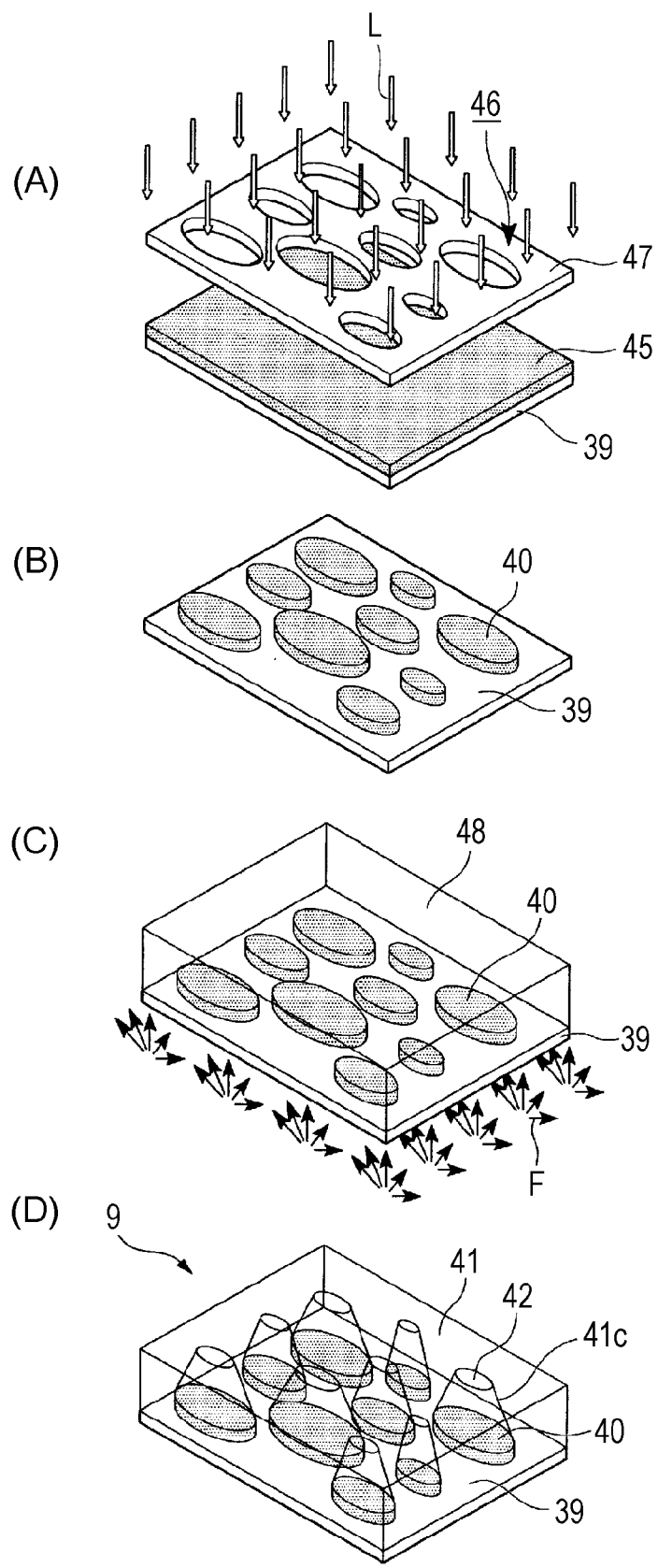
FIG. 11 includes perspective views (A)-(D) showing procedures of manufacturing a light diffusion member, in order.

FIG. 10 is a diagram showing characteristics of polar angle luminance of the backlight 8 in the liquid crystal display device 1 of the present embodiment. FIG. 10 is a diagram of polar coordinates showing luminance distribution in the azimuthal angle φ: 0°-180° direction and the azimuthal angle φ: 90°-270° direction. In FIG. 10, a horizontal axis denotes the polar angle θ [°], and a vertical axis denotes normalized luminance in which display luminance in a front direction is expressed as 1.

As described above, the backlight 8 of the present embodiment is the low directivity backlight in which the light-emitting direction is controlled and directivity is gently configured to some extent.

As shown in FIG. 10, an angle range of high luminance is relatively wide in the azimuthal angle φ: 0°-180° direction. In contrast, the angle range of high luminance is relatively narrow in the azimuthal angle φ: 90°-270° direction. That is, variations in luminance of the backlight 8 are the least in the azimuthal angle φ: 0°-180° direction. Meanwhile, variations in luminance of the backlight 8 in a polar angle direction are the greatest in the azimuthal angle φ: 90°-270° direction.

In this case, the total width of the polar angle when luminance is reduced to ⅓ of the maximum luminance in characteristics of the polar angle luminance of the backlight 8 is referred to as a ⅓-total width. In FIG. 10, the reference sign FW1 indicates the ⅓-total width of the backlight 8 in the azimuthal angle φ: 0°-180° direction, and the reference sign FW2 indicates the ⅓-total width of the backlight 8 in the azimuthal angle φ: 90°-270° direction.

In the present embodiment, the ⅓-total width FW1 of the backlight 8 in the azimuthal angle φ: 0°-180° direction in characteristics of the polar angle luminance of the backlight 8 is equal to or greater than 60°. Specifically, the ⅓-total width FW1 of the backlight 8 in the azimuthal angle φ: 0°-180° direction is 100°. Meanwhile, the ⅓-total width FW2 of the backlight 8 in the azimuthal angle φ: 90°-270° direction is 70°.

Here, "an azimuthal direction in which variations in luminance of the backlight 8 in the polar angle direction are the greatest" is referred to as a direction in which the tilt of a luminance curve is great when the polar angle and the luminance curve for each azimuthal angle are measured and illustrated.

"An azimuthal direction in which variations in luminance of the backlight 8 in the polar angle direction are the least" is referred to as a direction in which the tilt of the luminance curve is small when the polar angle and the luminance curve for each azimuthal angle are measured and illustrated.

"An azimuthal direction in which variations in transmittance in the polar angle direction are the greatest when a constant voltage is applied to the liquid crystal panel 2" is referred to as "a clear vision direction" in the TN type and is referred to as "a direction perpendicular to a falling direction of a director" in 1-division alignment and 2-division alignment of the VA type. In this case, the director is a direction of a principal axis of alignment (a direction in which major axes of molecules are averagely aligned in nematic liquid crystal).

In the present embodiment, "the azimuthal direction in which variations in luminance of the backlight 8 in the polar angle direction are the greatest" is the azimuthal angle φ: 90°-270° direction.

"The azimuthal direction in which variations in luminance of the backlight 8 in the polar angle direction are the least" is the azimuthal angle φ: 0°-180° direction.

"The azimuthal direction in which variations in transmittance in the polar angle direction are the greatest when a constant voltage is applied to the liquid crystal panel 2" is the azimuthal angle φ: 90°-270° direction.

In the present embodiment, the azimuthal direction in which variations in luminance of the backlight 8 in the polar angle direction are the least, that is, the ⅓-total width FW1 of the backlight 8 in the azimuthal angle φ: 0°-180° direction is 100°. However, the azimuthal direction is not limited thereto as long as the ⅓-total width FW1 of the backlight 8 in the azimuthal angle φ: 0°-180° direction is equal to or greater than 60°. It is preferable that the ⅓-total width FW1 of the backlight 8 in the azimuthal angle φ: 0°-180° direction be equal to or greater than 90°.

In the present embodiment, the azimuthal direction (the azimuthal angle φ: 90°-270° direction) in which variations in luminance of the backlight 8 in the polar angle direction are the greatest is caused to substantially match the azimuthal direction (the azimuthal angle φ: 90°-270° direction) in which variations in transmittance in the polar angle direction are the greatest when a constant voltage is applied to the liquid crystal panel 2.

The azimuthal direction in which variations in luminance of the backlight 8 in the polar angle direction are the greatest does not need to perfectly match the azimuthal direction in which variations in transmittance in the polar angle direction are the greatest when a constant voltage is applied to the liquid crystal panel 2 as long as the azimuthal directions substantially match each other. Generally, in assembling procedures of the liquid crystal display device, deviation in positioning between a liquid crystal panel and a backlight in a rotational direction is considered to be within approximately 5°. Accordingly, the technological scope of the present invention includes the case where the azimuthal direction in which variations in luminance of the backlight 8 in the polar angle direction are the greatest and the azimuthal direction in which variations in transmittance in the polar angle direction are the greatest when a constant voltage is applied to the liquid crystal panel 2 are deviated from each other by approximately 5°.

As shown in FIGS. 1 and 2, the light diffusion member 9 is arranged in the liquid crystal panel 2 on the light emission side. In the present embodiment, the azimuthal direction in which diffusibility of the light diffusion member 9 is the greatest (the Y-direction which is the short axis direction of the light shielding layer 40, shown in FIG. 5) is caused to substantially match the azimuthal direction (the azimuthal angle φ: 90°-270° direction) in which variations in transmittance in the polar angle direction are the greatest when a constant voltage is applied to the liquid crystal panel 2 of the light diffusion member 9.

The azimuthal direction in which diffusibility of the light diffusion member 9 is the greatest does not need to perfectly match the azimuthal direction in which variations in transmittance in the polar angle direction are the greatest when a constant voltage is applied to the liquid crystal panel 2 of the light diffusion member 9 as long as the azimuthal directions substantially match each other. Generally, in assembling procedures of the liquid crystal display device, deviation in positioning between a liquid crystal panel and a light diffusion member in a rotational direction is considered to be within approximately 5°. Accordingly, the technological scope of the present invention includes the case where the azimuthal direction in which diffusibility of the light diffusion member 9 is the greatest and the azimuthal direction in which variations in transmittance in the polar angle direction are the greatest when a constant voltage is applied to the liquid crystal panel 2 of the light diffusion member 9 are deviated from each other by approximately 5°.

That is, in the present embodiment, the azimuthal direction in which variations in luminance of the backlight 8 in the polar angle direction are the greatest, the azimuthal direction (the azimuthal angle φ: 90°-270° direction) in which variations in transmittance in the polar angle direction are the greatest when a constant voltage is applied to the liquid crystal panel 2, and the azimuthal direction in which diffusibility of the light diffusion member 9 is the greatest are caused to substantially match one another.

(Method of Manufacturing Liquid Crystal Display Device)

FIGS. 11(A) to 11(D) are perspective views showing procedures of manufacturing the light diffusion member 9, in order.

A method of manufacturing the light diffusion member 9 configured to be in the liquid crystal display device 1 having the above-described configuration will be described, mainly regarding procedures of manufacturing thereof.

To begin with, an outline of procedures of manufacturing the liquid crystal panel 2 will be described. Firstly, the TFT substrate 10 and the color filter substrate 12 are individually fabricated. Thereafter, a surface on a side where the TFT 19 of the TFT substrate 10 is formed and a surface on a side where the color filter 31 of the color filter substrate 12 are arranged so as to be opposite to each other. Then, the TFT substrate 10 and the color filter substrate 12 are bonded by interposing the sealing member therebetween. Thereafter, liquid crystal is injected into a space fixed by the TFT substrate 10, the color filter substrate 12, and the sealing member. Then, each of the first retardation film 4, the first polarization plate 3, the second retardation film 6, and the second polarization plate 7 are bonded to both surfaces of the liquid crystal cell 5 formed as described above, by using an optical adhesive and the like. A liquid crystal panel 2 is completed through the aforementioned procedures.

Incidentally, the TFT substrate 10 and the color filter substrate 12 may be manufactured through a routine procedure, and the description therefor will not be repeated.

Firstly, as shown in FIG. 11(A), the triacetyl cellulose base material 39 having a thickness of 100 μm is prepared. Subsequently, a black negative resist as a light shielding section material containing carbon is applied to the one surface of the base material 39 by a spin coat method. Accordingly, a coating membrane 45 having a membrane thickness of 150 nm is formed.

Subsequently, the base material 39 on which the coating membrane 45 is formed is placed on a hot plate, and the coating membrane 45 is prebaked at the temperature of 90° C. Accordingly, a solvent in the black negative resist is volatilized.

Subsequently, the coating membrane 45 is irradiated with light L through a photomask 47 in which a plurality of opening patterns 46 of which planar shapes are elliptical, for example, are formed, thereby being subjected to exposure by an exposure device. In this case, an exposure device adopting a mixed line including a line i having the wavelength of 365 nm, a line h having the wavelength of 404 nm, and a line g having the wavelength of 436 nm is used. An amount of exposure is 100 mJ/cm2.

After being subjected to exposure using the photomask 47, the coating membrane 45 formed of a black negative resist is developed by using an exclusive developing solution and is dried at 100° C., thereby forming the plurality of light shielding layers 40 of which planar shapes are elliptical, for example, on the one surface of the base material 39, as shown in FIG. 11(B). In the case of the present embodiment, a transparent negative resist having the light shielding layers 40 formed of the black negative resists as masks is subjected to exposure through the following procedure, thereby forming the hollow sections 42. Accordingly, positions of the opening patterns 46 in the photomask 47 respectively correspond to forming positions of the hollow sections 42.

The elliptical light shielding layers 40 correspond to non-forming regions of the light diffusion sections 41 (the hollow sections 42) in the following procedure. All the plurality of opening patterns 46 are elliptically patterned. The long diameters and the short diameters of the opening patterns 46 are configured to have various lengths. Arrangements of intervals (pitches) between the adjacent opening patterns 46 are neither regular nor cyclical. It is desirable that the intervals (the pitches) of the opening patterns 46 be less than intervals (pitches, for example, 150 μm) among pixels of the liquid crystal panel 2. Accordingly, at least one light shielding layer 40 is formed in the pixel. Therefore, a wide viewing angle can be achieved when being assembled in a liquid crystal panel having small pitches of pixels adopted in mobile devices, for example.

In the present embodiment, the light shielding layers 40 are formed by a photolithography method using a black negative resist. However, forming of the light shielding layers 40 is not limited thereto. In addition, a light-absorbing positive resist can be used when adopting a photomask in which the opening patterns 46 of the present embodiment and light shielding patterns are inverted. Otherwise, the light shielding layers 40 may be directly formed by an evaporation method, a printing method, or the like.

Subsequently, as shown in FIG. 11(C), a transparent negative resist as a light diffusion section material formed of an acrylic resin is applied to the top surface of the light shielding layer 40 by a spin coat method. Accordingly, a coating membrane 48 having a membrane thickness of 20 μm is formed.

Subsequently, the base material 39 on which the coating membrane 48 is formed is placed on a hot plate, and the coating membrane 48 is prebaked at a temperature of 95° C. Accordingly, a solvent in the black negative resist is volatilized.

Subsequently, the coating membrane 48 having the light shielding layer 40 as a mask is irradiated with light F from the base material 39 side, thereby being subjected to exposure. In this case, the exposure device adopting the mixed line including the line i having the wavelength of 365 nm, the line h having the wavelength of 404 nm, and the line g having the wavelength of 436 nm is used. An amount of exposure is 500 mJ/cm2.

Thereafter, the base material 39 on which the coating membrane 48 is formed is placed on the hot plate, and the coating membrane 48 is subjected to post-exposure bake (PEB) at a temperature of 95° C.

Subsequently, the coating membrane 48 formed of the transparent negative resist is developed by using an exclusive developing solution, and subjected to post-bake at 100° C., thereby forming a transparent resin layer 41 having the plurality of hollow sections 42 on the one surface of the base material 39, as shown in FIG. 11(D). In the present embodiment, since exposure is performed by using diffusion light as shown in FIG. 11(C), the transparent negative resist configuring the coating membrane 48 is subjected to exposure in a radial manner so as to be spread outward from non-forming regions of the light shielding layer 40. Accordingly, the hollow sections 42 are formed to be normally tapered. The light diffusion sections 41 are reversely tapered. The tilt angle of the reflection surface 41c in the light diffusion section 41 can be controlled by a diffusion rate of diffusion light.

As the light F used herein, it is possible to use parallel light, diffusion light, and light in which intensity in a particular emission angle is different from intensity in other emission angles, that is, light of which intensity varies in a particular emission angle. In a case of using the parallel light, the tilt angle of the reflection surface 41c in the light diffusion section 41 is formed to be a unitary tilt angle in a range of approximately 60° to 90°, for example. In a case of using the diffusion light, a tilt surface in which the tilt angle continuously changes and of which a cross-section has a curved shape is formed. In a case of using the light of which intensity varies in a particular emission angle, a tilt surface of which the tilt angle varies in response to the varying intensity is formed. In this manner, it is possible to adjust the tilt angle of the reflection surface 41c in the light diffusion section 41. Accordingly, light diffusibility of the light diffusion member 9 can be adjusted so as to obtain aimed visibility.

As means of irradiating the base material 39 with the parallel light as the light F emitted from the exposure device, a diffusion plate having a haze value of approximately 50 is arranged on an optical path of the light emitted from the exposure device, for example, and thus, the base material 39 is irradiated with light through the diffusion plate.

The light diffusion member 9 of the present embodiment is completed through the procedures in FIGS. 11(A) to 11(D) as described above. It is preferable that total light transmittance of the light diffusion member 9 be equal to or greater than 90%. When the total light transmittance is equal to or greater than 90%, sufficient transparency can be achieved, and thus, it is possible to sufficiently exhibit an optical performance required for the light diffusion member 9. The total light transmittance complies with the regulation in JIS K7361-1. In the present embodiment, a liquid resist is used as an example. However, a film resist may be used in place of the configuration thereof.

Lastly, the complete light diffusion member 9 is bonded to the liquid crystal panel 2 interposing the adhesive layer 43 therebetween in a state where the base material 39 is oriented toward the visible side and the light diffusion section 41 is caused to be opposite to the second polarization plate 7, as shown in FIG. 2.

The liquid crystal display device 1 of the present embodiment is completed through the procedures described above.

In the liquid crystal display device 1 according to the present embodiment, a low directivity backlight is used as described above. In this case, since the ⅓-total width FW1 of the backlight 8 is 100° in the azimuthal direction in which variations in luminance of the backlight 8 in the polar angle direction are the least (the azimuthal angle φ: 0°-180° direction), light which is spread to some extent is incident on the light diffusion member 9. Therefore, compared to a case of using a high directivity backlight, light having wide angle distribution is emitted from the light diffusion member 9. Accordingly, a degree of variations in luminance can be averaged by mixing light emitted from places difficult to be seen and light emitted from places easy to be seen. Thus, an observer can visually recognize a favorable display even though a visual line of the observer is tilted from the front direction (the normal direction) of the liquid crystal display device 1.

Moreover, in the present embodiment, the azimuthal direction in which variations in luminance of the backlight 8 in the polar angle direction are the greatest substantially matches the azimuthal direction (the azimuthal angle φ: 90°-270° direction) in which variations in transmittance in the polar angle direction are the greatest when a constant voltage is applied to the liquid crystal panel 2. Accordingly, light having relatively high directivity out of light emitted from the backlight 8 can be strongly diffused. As a result, narrowness of a luminance viewing angle of the liquid crystal panel 2 in the azimuthal angle φ: 90°-270° direction is improved. Thus, a liquid crystal display device 1 which excels in characteristics of the luminance viewing angle can be provided.

Moreover, the azimuthal direction in which diffusibility of the light diffusion member 9 is the greatest substantially matches the azimuthal direction (the azimuthal angle φ: 90°-270° direction) in which variations in transmittance in the polar angle direction are the greatest when a constant voltage is applied to the liquid crystal panel 2. Therefore, light emitted from the liquid crystal display device 1 in the azimuthal angle φ: 90°-270° direction is widely diffused compared to light emitted in other azimuthal directions. Accordingly, a degree of variations in luminance can be averaged between the azimuthal angle φ: 90°-270° direction and other azimuthal directions. Therefore, a luminance peak is suppressed from being deviated in a particular azimuthal direction in characteristics of a contrast viewing angle during a white display. In other words, a symmetric property of luminance distribution can be enhanced. Accordingly, it is possible to suppress grayscale inversion when viewing a display screen in an oblique direction and to provide the liquid crystal display device 1 which is excellent in viewing angle characteristics.

Generally, it is known that when patterns having regularity such as stripes and lattices are superposed together, interference fringe patterns (moire) are visually recognized if cycles of the patterns are slightly deviated from each other. For example, when a light diffusion member in which a plurality of light diffusion sections are arrayed in a matrix is superposed on a liquid crystal panel in which a plurality of pixels are arrayed in a matrix, there is an occurrence of moire between cyclic patterns formed by the light diffusion sections of the light diffusion member and cyclic patterns formed by the pixels of the liquid crystal panel, and thus, display quality may be degraded.

In contrast, in the liquid crystal display device 1 of the present embodiment, the plurality of light shielding layers 40 are planarly arranged at random. The light diffusion sections 41 are formed in regions other than the forming regions of the light shielding layers 40. Thus, the display quality can be maintained without causing moire due to interference among regularly arrayed pixels of the liquid crystal panel 2.

In the present embodiment, the plurality of light shielding layers 40 are arranged at random. However, the plurality of light shielding layers 40 are not necessarily arranged at random. When the plurality of light shielding layers 40 are arranged in an acyclic manner, the occurrence of moire can be suppressed. Moreover, if the occurrence of moire is acceptable due to conditions and purposes, the plurality of light shielding layers 40 may be arranged in a cyclic manner.

Second Embodiment

Hereinafter, a second embodiment of the present invention will be described with reference to FIGS. 12 and 13.

A basic configuration of a liquid crystal display device 101 of the present embodiment is identical to that of the first embodiment, and the present embodiment is different from the first embodiment in that a light scattering film 102 is included.

Figure 12:
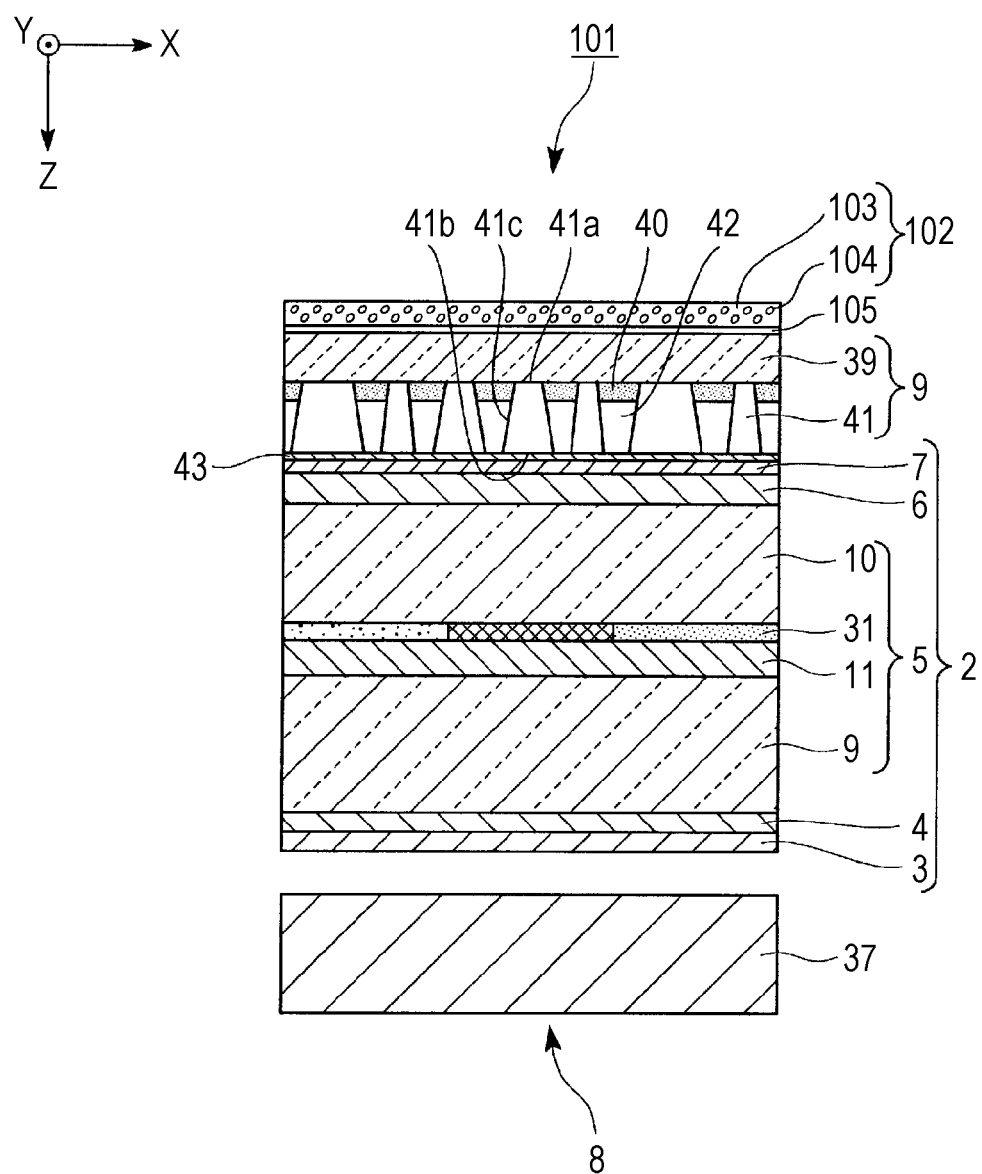
FIG. 12 is a cross-sectional view of the liquid crystal display device of a second embodiment.

FIG. 12 is a cross-sectional view of the liquid crystal display device 101 of the present embodiment.

In FIG. 12, the same reference numerals and signs are applied to the configuration elements which are common to that in the drawing used in the first embodiment, and the detailed description will not be repeated.

As shown in FIG. 12, the liquid crystal display device 101 of the present embodiment further includes the light scattering film 102 (a light scattering member) in the light diffusion member 9 on the light emission side.

The light scattering film 102 is formed by scattering a plurality of light scattering bodies 104 inside a binder resin 103. An acrylic resin is used as the binder resin 103, for example. Acrylic beads are used as the light scattering body 104, for example. The light scattering film 102 is fixed on the visible side surface of the base material 39 by an adhesive layer 105.

Figure 13:
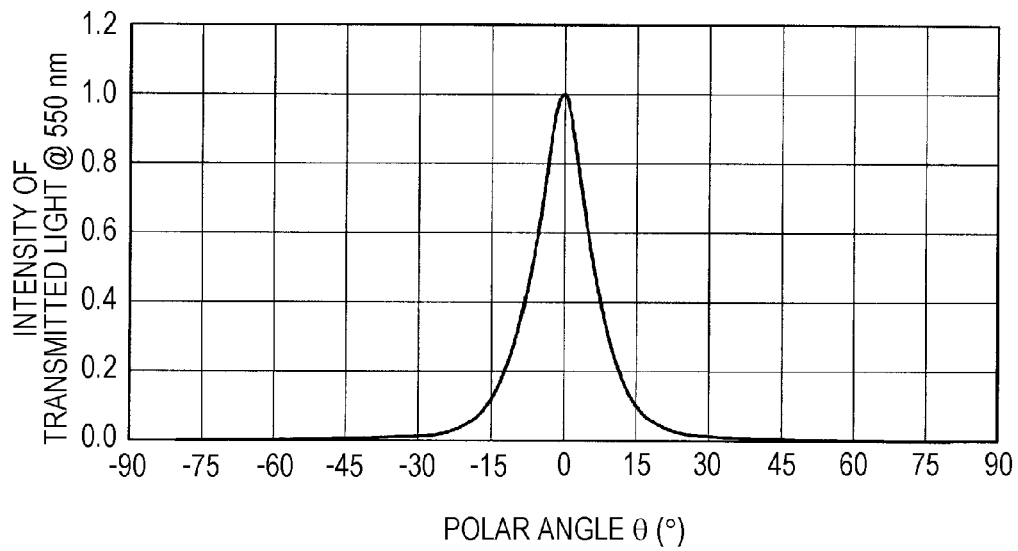
FIG. 13 is a diagram showing characteristics of a light scattering film.

FIG. 13 is a diagram showing characteristics of the light scattering film 102. The characteristics thereof are characteristics obtained when floodlighting is performed vertically onto one surface (a side surface on the base material 39) of the light scattering film 102 by using LCD evaluation equipment (brand name: LCD-5200) manufactured by Otsuka Electronics Co., Ltd. In FIG. 13, the horizontal axis indicates the polar angle θ [°]. The vertical axis indicates intensity of light transmitted (transmitting intensity) through the light scattering film 102 when floodlighting is performed with light having a wavelength of 550 nm vertically onto the one surface of the light scattering film 102.

As shown in FIG. 13, characteristics of transmitting intensity of the light scattering film 102 are isotropic with respect to the azimuthal direction.

Similarly to the light diffusion member 9, the light scattering film 102 may scatter light in an anisotropic manner, and may scatter light in an isotropic manner. It is possible to sufficiently diffuse light which the light diffusion member 9 cannot completely diffuse, by using the aforementioned type of the light scattering film 102.

Third Embodiment

Hereinafter, a third embodiment of the present invention will be described with reference to FIG. 14.

A basic configuration of the liquid crystal display device of the present embodiment is identical to that of the first embodiment, and the present embodiment is different from the first embodiment in that a plurality of light diffusion sections 341 are arranged in a light diffusion member 309. Thus, in the present embodiment, a description will be given regarding the light diffusion member 309.

Figure 14:
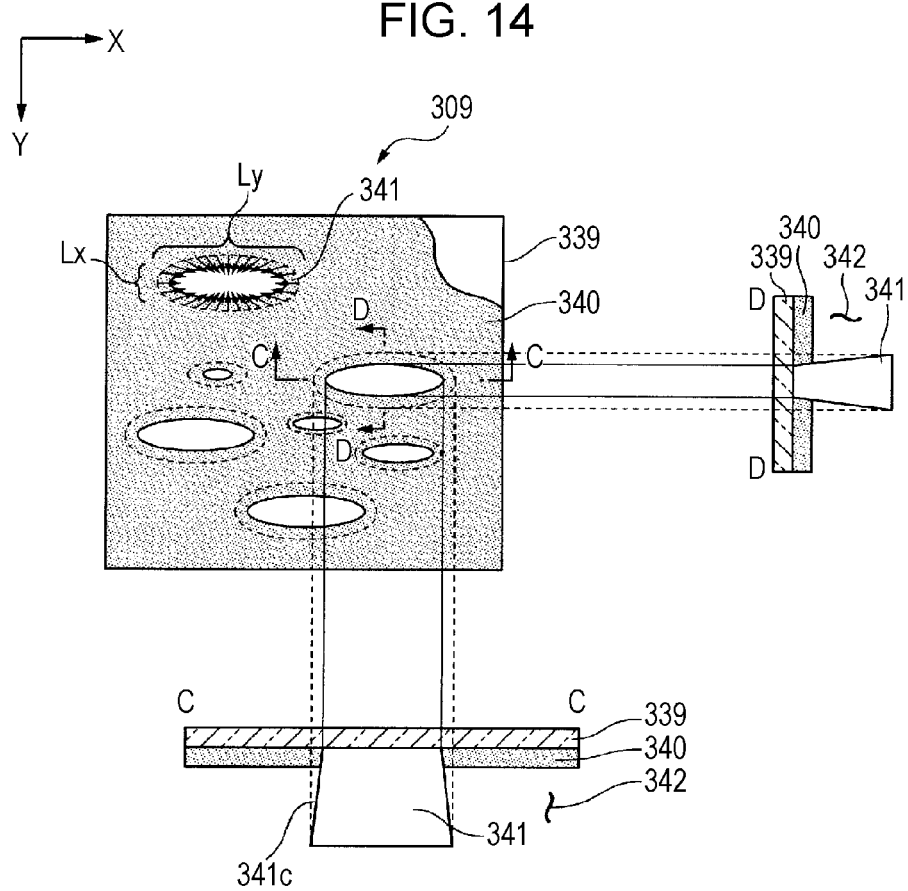
FIG. 14 is a plan view of the light diffusion member of a third embodiment.

FIG. 14 is a schematic view of the light diffusion member 309. In FIG. 14, the diagram on the upper left side is a plan view of the light diffusion member 309. The diagram on the lower left side is a cross-sectional view taken along line C-C of the plan view on the upper left side. The diagram on the upper right side is a cross-sectional view taken along line D-D of the plan view on the upper left side.

As shown on the upper left side in FIG. 14, in the light diffusion member 309 of the present embodiment, the plurality of light diffusion sections 341 are provided to be interspersed on one surface of a base material 339. A planar shape of the light diffusion section 341 viewed from the normal direction of the base material 339 is an elongated elliptical shape. The light diffusion section 341 has a long axis and a short axis.

As shown in FIG. 14 on the lower left side and the upper right side, a portion corresponding to a lower portion of a light shielding layer 340 is a hollow section 342. Air is present in the hollow section 342. The light diffusion member 309 has the continuously formed hollow section 342 in which air is present. The light diffusion sections 341 are provided to be interspersed in portions other than the hollow section 342.

Long axis directions of the plurality of light diffusion sections 341 substantially match the X-direction. Short axis directions of the plurality of light diffusion sections 341 substantially match the Y-direction. Accordingly, when considering an orientation of a reflection surface 341c in the light diffusion section 341, a ratio of the reflection surface 341c along the X-direction out of the reflection surfaces 341c of the light diffusion section 341 is greater than a ratio of the reflection surface 341c along the Y-direction. Therefore, the light Ly which is reflected by the reflection surface 341c along the X-direction and is diffused in the Y-direction is greater than the light Lx which is reflected by the reflection surface 341c along the Y-direction and is diffused in the X-direction. Accordingly, an azimuthal direction in which diffusibility of the light diffusion member 309 is the greatest is the Y-direction which is the short axis direction of the light diffusion section 341.

In the present embodiment, the light diffusion member 309 is arranged in the liquid crystal panel 2 on the light emission side. Moreover, the azimuthal direction (the azimuthal angle φ: 90°-270° direction) in which variations in transmittance in the polar angle direction are the greatest when a constant voltage is applied to the liquid crystal panel 2 of the light diffusion member 309 substantially matches the azimuthal direction in which diffusibility of the light diffusion member 309 is the greatest (the Y-direction which is the short axis direction of the light diffusion section 341).

Even in a case where the light diffusion member 309 is used, it is possible to suppress grayscale inversion when viewing a display screen in the oblique direction and to realize a display image which is excellent in viewing angle characteristics.

The planar shape of the light diffusion section 341 may include a circular shape, a polygon shape, a semicircular shape, and the like. In addition, openings of the light diffusion sections 341 may be formed to overlap each other.

Fourth Embodiment

Hereinafter, a fourth embodiment of the present invention will be described with reference to FIGS. 15(A) to 15(C).

A basic configuration of the liquid crystal display device of the present embodiment is identical to that of the first embodiment, and the present embodiment is different from the first embodiment in that the shape of the light shielding layer in the light diffusion member is different from that of the first embodiment.

Thus, in the present embodiment, the light shielding layer will be described without repeating the description regarding the basic configuration of the liquid crystal display device.

Figure 15:
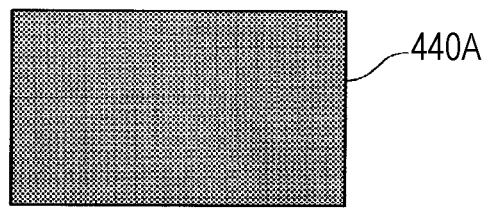
FIG. 15 includes plan views (A)-(C) of the light shielding layer of a fourth embodiment.
Figure 15:
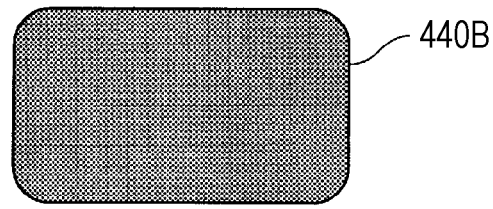
Figure 15:
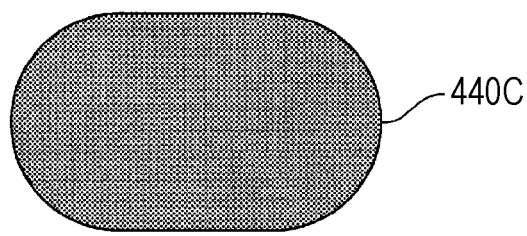

FIGS. 15(A) to 15(C) are plan views of the light shielding layers of the present embodiment.

As shown in FIGS. 15(A) to 15(C), the shape of the light shielding layer of the present embodiment is an anisotropic shape having a long axis and a short axis.

Specifically, the shape of a light shielding layer 440A shown in FIG. 15(A) is rectangular. The shape of a light shielding layer 440B shown in FIG. 15(B) is rectangular having rounded corners. The shape of a light shielding layer 440C shown in FIG. 15(C) is rectangular having further rounded corners (an athletic field shape).

In the present embodiment, short axis directions of the light shielding layers 440A to 440C substantially match the azimuthal direction (the azimuthal angle φ: 90°-270° direction) in which variations in transmittance in the polar angle direction are the greatest when a constant voltage is applied to the liquid crystal panel 2.

Even though the light shielding layers 440A to 440C of the present embodiment are used, it is possible to suppress grayscale inversion when viewing a display screen in the oblique direction and to obtain a display which is excellent in viewing angle characteristics.

The shape of the light shielding layer is not limited to the shape of the present embodiment. It is acceptable as long as the shape of the light shielding layer is at least an anisotropic shape having a long axis and a short axis. When the shape of the light shielding layer is a shape other than the elliptical or rectangular shape, the long axis and the short axis thereof are defined as follows. The long axis is referred to as the longest axis when lengths are measured for each azimuth in a planar shape of the light shielding layer viewed from the normal direction of the base material. The short axis is referred to as the shortest axis when the lengths are measured for each azimuth in a planar shape of the light shielding layer viewed from the normal direction of the base material.

Fifth Embodiment

Hereinafter, a fifth embodiment of the present invention will be described with reference to FIGS. 16(A) and 16(B).

A basic configuration of the liquid crystal display device of the present embodiment is identical to that of the first embodiment, and the present embodiment is different from the first embodiment in a domain structure of the liquid crystal panel.

Thus, in the present embodiment, a description will be given regarding the domain structure of the liquid crystal panel will be described without repeating the description regarding the basic configuration of the liquid crystal display device.

Figure 16:
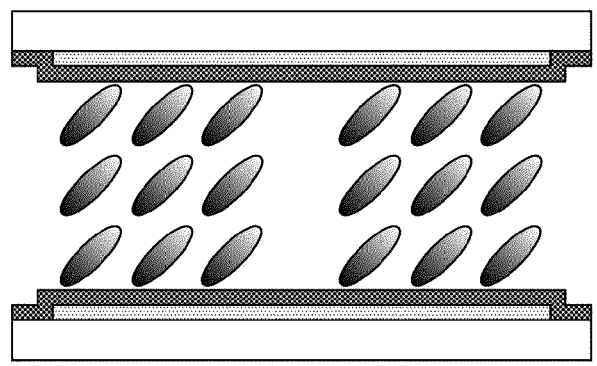
FIG. 16 includes diagrams (A) and (B) showing domain structures of the liquid crystal panel of a fifth embodiment.
Figure 16:
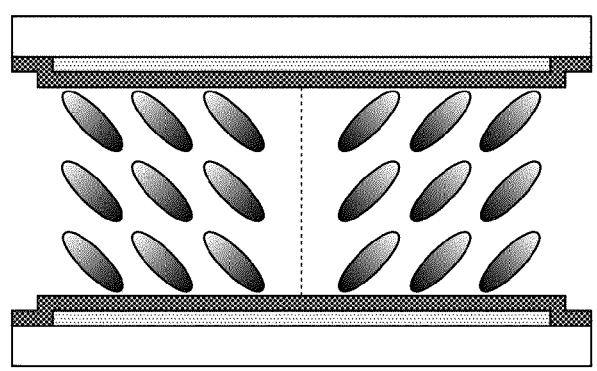

FIGS. 16(A) and 16(B) are diagrams showing the domain structures of the liquid crystal panel of the present embodiment. Specifically, the domain structure shown in FIG. 16(A) is a monodomain structure, and the domain structure shown in FIG. 16(B) is a multi-domain structure.

Here, the monodomain structure denotes a structure in which one domain is formed in a uniform alignment state of liquid crystal in the liquid crystal layer. The multi-domain structure denotes a structure in which a plurality of the domains are formed in different alignment states of liquid crystal in the liquid crystal layer. The multi-domain structure is formed by providing a plurality of regions in which liquid crystal is pre-tilted in different directions in an alignment membrane. The "pre-tilted" denotes a state where an alignment direction (a long axis direction in a molecule of the liquid crystal) of the liquid crystal is tilted in a slightly horizontal direction (a direction parallel to an XY-plane) from a direction vertical to an outer surface of the alignment membrane (Z-direction). As a method of applying a pre-tilted angle to liquid crystal, there are a method of performing rubbing treatment onto the alignment membrane, a method of performing light alignment treatment onto the alignment membrane, and the like. Even though the alignment membrane is formed by oblique vapor deposition, a pre-tilted angle can be applied to liquid crystal.

Even though the domain structure of the liquid crystal panel is the monodomain structure or the multi-domain structure, it is possible to suppress grayscale inversion when viewing a display screen in the oblique direction and to obtain a display which is excellent in viewing angle characteristics.

The technological scope of the present invention is not limited to the above-described embodiments, and thus, it is possible to add various changes without departing from the spirit of the present invention.

In addition, at least one out of an antireflection layer, a polarization filter layer, an antistatic layer, an antiglare layer, and a stain-proof treatment layer may be configured to be provided on the visible side of the base material in the light diffusion member of the above-described embodiments. According to the configuration, it is possible to add a function to decrease natural light reflection, a function to prevent adhesion of dust or stain, and a function to prevent scratch, in response to the type of the layer to be provided on the visible side of the base material, and thus, time degradation in viewing angle characteristics can be prevented.

In addition, in the above-described embodiments, the light diffusion section or the space portion is formed to have an elliptical frustum shape. However, the light diffusion section or the space portion may have other shapes. In addition, the tilt angle of the reflection surface in the light diffusion section is not necessarily symmetric with an optical axis as the center. When the light diffusion section is formed to have the elliptical frustum shape as in the above-described embodiments, the tilt angle of the reflection surface in the light diffusion section is in line symmetry with the optical axis as the center, and thus, angle distribution line-symmetric with the optical axis as the center can be obtained. In contrast, when asymmetric angle distribution is intentionally required in accordance with a purpose or usage of a display device, for example, when there is a need of widening the viewing angle in the screen only on an upper side or a right side, the tilt angle of the reflection surface in the light diffusion section may be caused to be asymmetric.

Furthermore, the specific configuration of the liquid crystal display device regarding materials, the number, arrangements for each configuration member can be appropriately changed without being limited to the above-described embodiments. For example, in the above-described embodiments, a polarization plate or a retardation plate is arranged on an outer side of the liquid crystal panel as an example. However, in place thereof, a polarization layer or a retardation layer may be formed on an inner side of a pair of substrates configuring the liquid crystal panel.

EXAMPLES

Hereinafter, the present invention will be further described with reference to Example and Comparison Example. However, the present invention is not limited to the following Example.

The inventor has compared characteristics of grayscale luminance between the liquid crystal display device of the present invention and a liquid crystal display device of Comparison Example, in order to verify the effect of the liquid crystal display device of the present invention. Hereinafter, a description will be given regarding compared results thereof.

A TN mode liquid crystal panel is used as the liquid crystal panel. A WV film manufactured by Fujifilm Corporation is used as the retardation film.

Comparison Example 1

The liquid crystal display device does not include the light diffusion member. The backlight is a low directivity backlight. The liquid crystal display device of Comparison Example 1 corresponds to the liquid crystal display device 1 of the first embodiment from which the light diffusion member 9 is removed.

Example 1

The liquid crystal display device having a light diffusion member in which light is anisotropically diffused is used. The shape of the light shielding layer in the light diffusion member in a planar view is elliptical. The backlight is a low directivity backlight. The liquid crystal display device of the example 1 corresponds to the liquid crystal display device 1 of the first embodiment.

Parameters of the light diffusion member are as follows. The length of the long axis in the light shielding layer is 20 µm. The length of the short axis in the light shielding layer is 10 µm. The refractive index of the light diffusion section is 1.5. The refractive index of an air space is 1.0. The tilt angle of the reflection surface in the light diffusion section is 85°. The height of the light diffusion section is 20 µm. An area ratio of the forming region of the light shielding layer is 0.3.

A simulation is carried out in order to check characteristics of the polar angle luminance in Comparison Example and Example. As software for the simulation, Light TooLs is used. The results thereof are shown in FIGS. 17 to 19.

Figure 17:
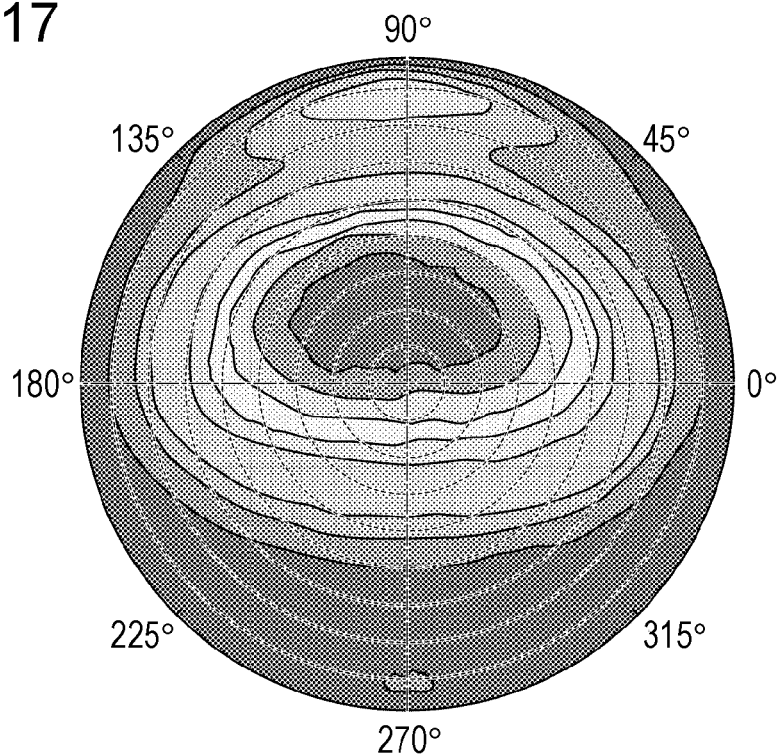
FIG. 17 includes a diagram showing characteristics of the polar angle luminance when the liquid crystal display device of Comparison Example is used.

FIG. 17 illustrates iso luminance curves when the liquid crystal display device of Comparison Example 1 is used. FIG. 18 illustrates iso luminance curves when the liquid crystal display device of Example 1 is used. FIG. 19 is a diagram of polar coordinates indicating luminance distribution in the azimuthal angle: 90°-270° direction (the vertical direction of the screen) with respect to the iso luminance curves in FIGS. 17 and 18. In FIG. 19, the horizontal axis indicates the polar angle [°], and the vertical axis indicates normalized luminance. The normalized luminance indicates values having the display luminance in the front direction as 1 when an input grayscale exhibits the greatest grayscale (grayscale 255).

Figure 18:
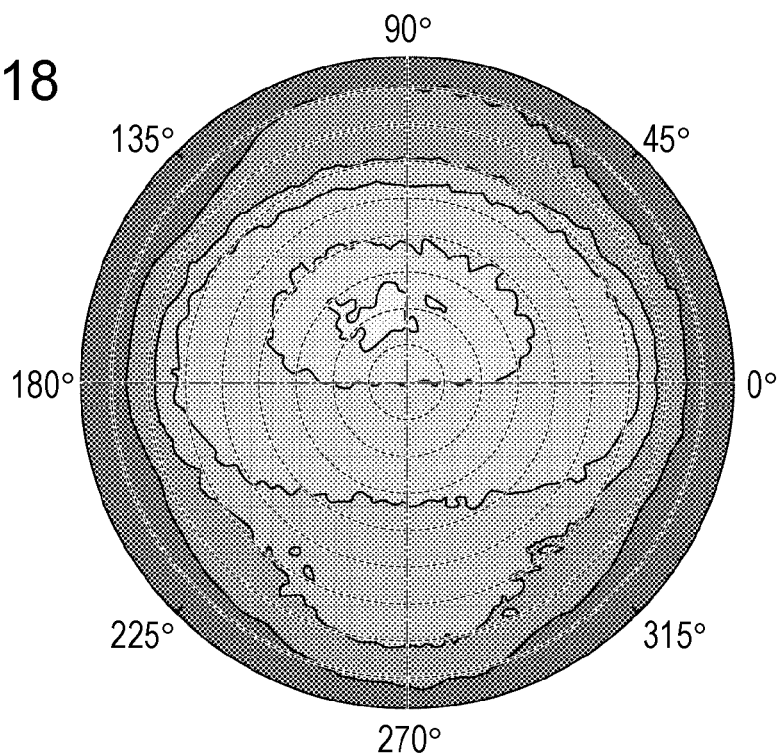
FIG. 18 includes a diagram showing characteristics of the polar angle luminance when the liquid crystal display device of Example is used.

As shown in FIGS. 17 and 18, according to the results of "Comparison Example 1" and "Example 1", there is no grayscale inversion or grayscale collapse observed in the azimuthal angle φ: 0°-180° direction (the lateral direction of the screen).

Figure 19:
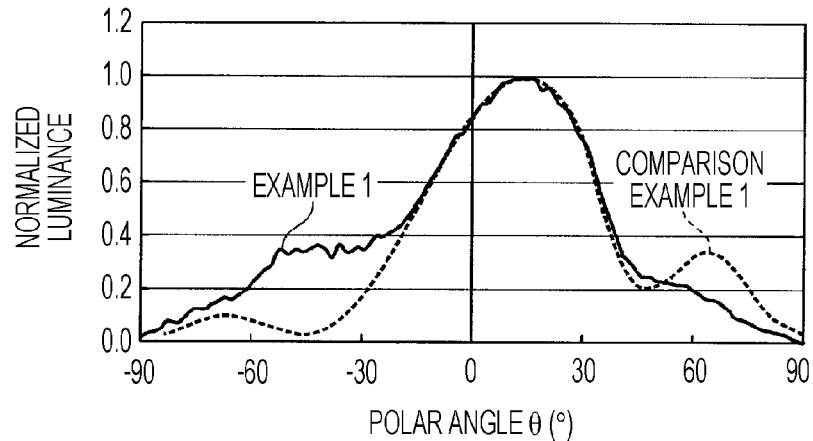
FIG. 19 is a diagram showing characteristics of the polar angle luminance when the liquid crystal display devices of Comparison Example and Example are used.

However, as shown in FIGS. 17 and 19, in "Comparison Example 1", grayscale collapse is observed in the azimuthal angle φ: 90°-270° direction (the vertical direction of the screen). For example, in "Comparison Example 1", as shown in FIG. 19, luminance of a polar angle θ: −30° to −60° steeply changes. Particularly, grayscale collapse is observed in the vicinity of a polar angle θ: −45°.

In contrast, as shown in FIGS. 18 and 19, in "Example 1", neither grayscale inversion nor grayscale collapse is observed in the azimuthal angle φ: 90°-270° direction (the vertical direction of the screen). For example, in "Example 1", as shown in FIG. 19, luminance of the polar angle θ: −30° to −60° gently changes.

According to the results of "Comparison Example 1" and "Example 1", it has been learned that an occurrence of grayscale inversion and grayscale collapse can be prevented by arranging a light diffusion member which causes light to be anisotropically diffused and substantially matching an azimuthal direction in which variations in transmittance in the polar angle direction are the greatest when a constant voltage is applied to the liquid crystal panel and an azimuthal direction in which diffusibility of the light diffusion member is the greatest.

In addition, the inventor has carried out simulation and check characteristics of the polar angle luminance in order to verify a favorable value range for the area ratio S1/S2 between the forming regions in the light shielding layer configuring the liquid crystal display device of the present invention. As software for the simulation, Light TooLs is used. The result thereof is shown in FIG. 20.

Figure 20:
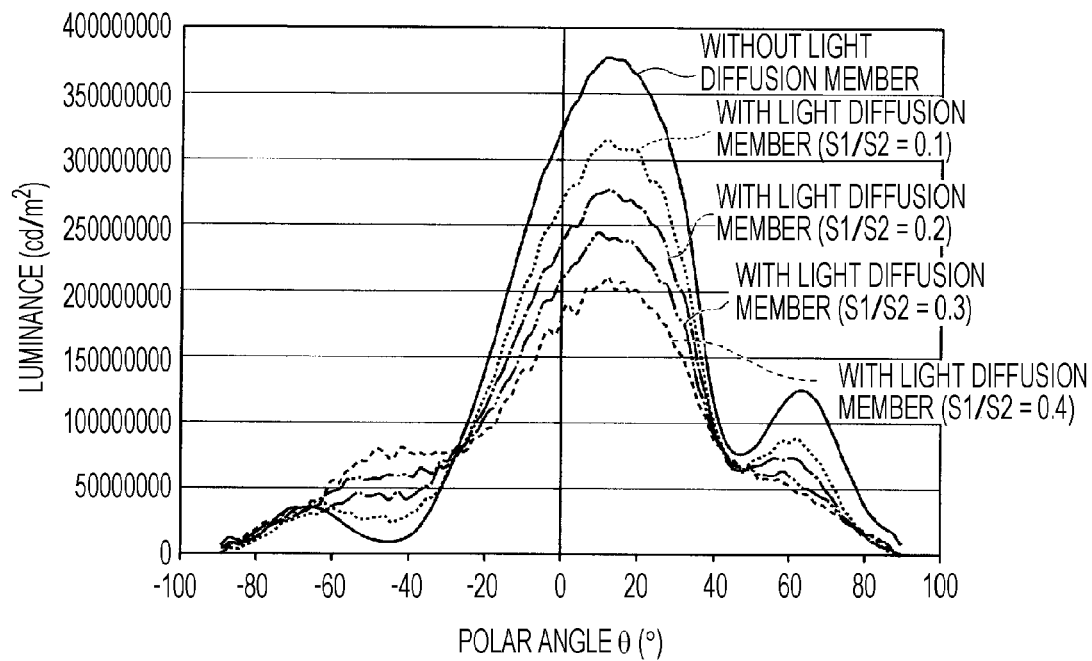
FIG. 20 is a diagram showing characteristics of the polar angle luminance when an area ratio of a forming region of the light shielding layer is changed.

FIG. 20 is a diagram showing characteristics of the polar angle luminance in the azimuthal angle: 90°-270° direction (the vertical direction of the screen) when an area ratio of a forming region of the light shielding layer is changed. In FIG. 20, the horizontal axis indicates the polar angle [°], and the vertical axis indicates luminance [cd/m²]. In the horizontal axis, the negative direction is the azimuthal angle: 90° direction and the positive direction is the azimuthal angle: 270° direction.

A TN mode liquid crystal panel is used as the liquid crystal panel. The backlight is a low directivity backlight.

The liquid crystal display device "having no light diffusion member" corresponds to the liquid crystal display device 1 of the first embodiment from which the light diffusion member 9 is removed.

The liquid crystal display device "having a light diffusion member" corresponds to the liquid crystal display device 1 of the first embodiment.

Parameters of the light diffusion member are as follows. The length of the long axis in the light shielding layer is 11 μm. The length of the short axis in the light shielding layer is 10 μm. The refractive index of the light diffusion section is 1.5. The refractive index of an air space is 1.0. The tilt angle of the reflection surface in the light diffusion section is 85°. The height of the light diffusion section is 20 μm. There are four types of the area ratios of the forming region in the light shielding layer such as "S1/S2=0.1", "S1/S2=0.2", "S1/S2=0.3", and "S1/S2=0.4".

As shown in FIG. 20, when "having no light diffusion member", grayscale collapse is observed in the azimuthal angle φ: 90°-270° direction (the vertical direction of the screen). For example, when "having no light diffusion member", luminance of the polar angle θ: −30° to −60° steeply changes. Particularly, grayscale collapse is observed in the vicinity of a polar angle θ: −45°.

In contrast, when "having the light diffusion member", neither grayscale inversion nor grayscale collapse is observed in the azimuthal angle φ: 90°-270° direction (the vertical direction of the screen). For example, in a case of "S1/S2=0.1", luminance of the polar angle θ: −30° to −60° gently changes. In addition, as "S1/S" increases, luminance in the vicinity of the polar angle θ: −45° increases. In a case of S1/S2=0.4, there is no variation in luminance of the polar angle θ −30° to −60°. Supposedly, in a case of "S1/S2=0.4", it is considered that the peak of luminance appears in the vicinity of the polar angle θ: −45°.

According to the above-described results, it is learned that the area ratio S1/S2 between the forming regions of the light shielding layer preferably ranges from 0.1 to 0.4, in order to suppress an occurrence of grayscale inversion or grayscale collapse.

In addition, the inventor has carried out simulation and check characteristics of the polar angle luminance in order to verify a favorable value range for the ratio B1/B2 between the length B1 of the long axis and the length B2 of the short axis in the light shielding layer configuring the liquid crystal display device of the present invention. As software for the simulation, Light TooLs is used. The result thereof is shown in FIG. 21.

Figure 21:
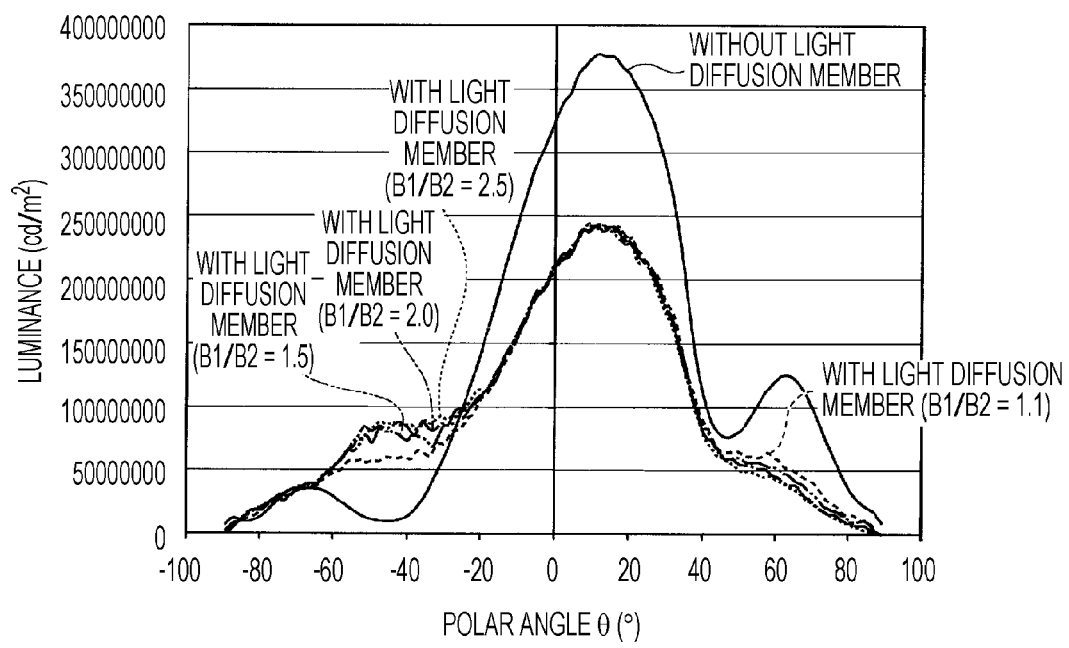
FIG. 21 is a diagram showing characteristics of the polar angle luminance when a ratio between the length of a long axis and the length of a short axis in the light shielding layer is changed.

FIG. 21 is a diagram showing characteristics of the polar angle luminance in the azimuthal angle: 90°-270° direction (the vertical direction of the screen) when the ratio of a length of the long axis and a length of the short axis in the light shielding layer is changed. In FIG. 21, the horizontal axis indicates the polar angle [°], and the vertical axis indicates luminance [cd/m²]. In the horizontal axis, the negative direction is the azimuthal angle: 90° direction and the positive direction is the azimuthal angle: 270° direction.

A TN mode liquid crystal panel is used as the liquid crystal panel. The backlight is a low directivity backlight.

The liquid crystal display device "having no light diffusion member" corresponds to the liquid crystal display device 1 of the first embodiment from which the light diffusion member 9 is removed.

The liquid crystal display device "having a light diffusion member" corresponds to the liquid crystal display device 1 of the first embodiment.

Parameters of the light diffusion member are as follows. The refractive index of the light diffusion section is 1.5. The refractive index of an air space is 1.0. The tilt angle of the reflection surface in the light diffusion section is 85°. The height of the light diffusion section is 20 μm. The area ratio of the forming region of the light shielding layer is 0.3. There are four types of the ratios B1/B2 between the length B1 of the long axis and the length B2 of the short axis in the light shielding layer such as "B1/B2=1.1", "B1/B2=1.5", "B1/B2=2.0", and "B1/B2=2.5". The length B2 of the short axis in the light shielding layer is fixed to 10 μm. The lengths B1 of the long axis in the light shielding layer are respectively configured to be 11 μm, 15 μm, 20 μm, and 25 μm.

As shown in FIG. 21, when "having no light diffusion member", grayscale collapse is observed in the azimuthal angle φ: 90°-270° direction (the vertical direction of the screen). For example, when "having no light diffusion member", luminance of the polar angle θ: −30° to −60° steeply changes. Particularly, grayscale collapse is observed in the vicinity of a polar angle θ: −45°.

In contrast, when "having the light diffusion member", neither grayscale inversion nor grayscale collapse is observed in the azimuthal angle φ: 90°-270° direction (the vertical direction of the screen). For example, in a case of "B1/B2=1.1", luminance of the polar angle θ: −30° to −60° gently changes. In addition, as "B1/B2=1.1" increases, luminance in the vicinity of the polar angle θ: −45° increases. However, in cases of "B1/B2=2.0" and "B1/B2=2.5", there is little change of luminance in the vicinity of the polar angle θ: −45°. Supposedly, when the ratio B1/B2 between the length B1 of the long axis and the length B2 of the short axis in the light shielding layer is exceedingly increased, an amount of light passing through liquid crystal to be directly incident on the light shielding layer tends to increase, thereby causing a possibility of degradation of the efficiency.

According to the above-described results, it is learned that the ratio B1/B2 between the length B1 of the long axis and the length B2 of the short axis in the light shielding layer ranges from 1.1 to 2.5, in order to suppress an occurrence of grayscale inversion or grayscale collapse.

INDUSTRIAL APPLICABILITY

According to the present invention, it is possible to be utilized in a liquid crystal display device used in various displays, and display units such as portable electronic devices.

REFERENCE SIGNS LIST 1, 101 liquid crystal display device
2 liquid crystal panel 3 first polarization plate
4 first retardation film (retardation plate)
6 second retardation film (retardation plate)
7 second polarization plate
8 backlight (illumination device)
9, 309 light diffusion member
11 liquid crystal layer
39, 339 base material
40, 340, 440A, 440B, 440C light shielding layer
41, 341 light diffusion section
41a light emission end surface
41b light incident end surface
41c, 341c reflection surface
102 light scattering film (light scattering member)
θ polar angle
φ azimuthal angle

The invention claimed is:

1. A liquid crystal display device comprising:
a liquid crystal panel that includes a pair of substrates, a liquid crystal layer disposed between the pair of substrates, and a pair of polarization plates respectively arranged in the liquid crystal layer on a light incident side and a light emission side;
an illumination device that is arranged on the light incident side of the liquid crystal panel and emits light toward the liquid crystal panel; and
a light diffusion member that is arranged on the light emission side of the liquid crystal panel and causes light emitted from the liquid crystal panel to be diffused in an azimuthal direction viewed from a normal direction of the liquid crystal panel,
wherein the light diffusion member includes a base material which is optically transparent, a plurality of light shielding layers which are formed on one surface of the base material, and a light diffusion section which is formed in a region other than a forming region of the light shielding layer on the one surface of the base material,
wherein the light diffusion section has a light emission end surface which is in contact with the base material, a light incident end surface which is opposite to the light emission end surface and has an area greater than the area of the light emission end surface, and a reflection surface which is in contact with the light emission end surface and the light incident end surface and reflects light incident from the light incident end surface,
wherein a height of the light diffusion section from the light incident end surface to the light emission end surface is greater than a layer thickness of the light shielding layer,
wherein when the total width of a polar angle when luminance is reduced to ⅓ of the maximum luminance in characteristics of polar angle luminance of the illumination device is referred to as a ⅓-total width, the ⅓-total width of the illumination device is equal to or greater than 60° in the azimuthal direction in which variations in luminance of the illumination device in a polar angle direction are the greatest, and
wherein the azimuthal direction in which variations in luminance of the illumination device in a polar angle direction are the greatest substantially matches an azimuthal direction in which variations in transmittance in the polar angle direction are the greatest when a constant voltage is applied to the liquid crystal panel.

2. The liquid crystal display device according to claim 1, wherein the ⅓-total width of the illumination device is equal to or greater than 90° in an azimuthal direction in which variations in luminance of the illumination device in the polar angle direction are the least.

3. The liquid crystal display device according to claim 1, wherein a display mode of the liquid crystal panel is a twisted-nematic mode.

4. The liquid crystal display device according to claim 1, wherein a domain structure of the liquid crystal panel is a monodomain structure or a multi-domain structure.

5. The liquid crystal display device according to claim 1, wherein a light scattering member which scatters incident light is provided on the light emission side of the light diffusion member.

6. A liquid crystal display device comprising:
a liquid crystal panel that includes a pair of substrates, a liquid crystal layer disposed between the pair of substrates, and a pair of polarization plates respectively arranged in the liquid crystal layer on a light incident side and a light emission side;
an illumination device that is arranged on the light incident side of the liquid crystal panel and emits light toward the liquid crystal panel; and
a light diffusion member that is arranged on the light emission side of the liquid crystal panel and causes light emitted from the liquid crystal panel to be diffused in an azimuthal direction viewed from a normal direction of the liquid crystal panel,
wherein the light diffusion member includes a base material which is optically transparent, a plurality of light shielding layers which are formed on one surface of the base material, and a light diffusion section which is formed in a region other than a forming region of the light shielding layer on the one surface of the base material,
wherein the light diffusion section has a light emission end surface which is in contact with the base material, a light incident end surface which is opposite to the light emission end surface and has an area greater than the area of the light emission end surface, and a reflection surface which is in contact with the light emission end surface and the light incident end surface and reflects light incident from the light incident end surface,
wherein a height of the light diffusion section from the light incident end surface to the light emission end surface is greater than a layer thickness of the light shielding layer,
wherein when the total width of a polar angle when luminance is reduced to ⅓ of the maximum luminance in characteristics of polar angle luminance of the illumination device is referred to as a ⅓-total width, the ⅓-total width of the illumination device is equal to or greater than 60° in the azimuthal direction in which variations in luminance of the illumination device in a polar angle direction are the greatest,
wherein the light diffusion member causes light emitted from the liquid crystal panel to be anisotropically diffused in the azimuthal direction viewed from the normal direction of the liquid crystal panel so as to control a light emitting direction, and
wherein the azimuthal direction in which diffusibility of the light diffusion member is the greatest substantially matches the azimuthal direction in which variations in transmittance in the polar angle direction are the greatest when a constant voltage is applied to the liquid crystal panel.

7. A liquid crystal display device comprising:
a liquid crystal panel that includes a pair of substrates, a liquid crystal layer disposed between the pair of substrates, and a pair of polarization plates respectively arranged in the liquid crystal layer on a light incident side and a light emission side;
an illumination device that is arranged on the light incident side of the liquid crystal panel and emits light toward the liquid crystal panel; and
a light diffusion member that is arranged on the light emission side of the liquid crystal panel and causes light emitted from the liquid crystal panel to be diffused in an azimuthal direction viewed from a normal direction of the liquid crystal panel, wherein
the light diffusion member includes a base material which is optically transparent, a plurality of light shielding layers which are formed on one surface of the base material, and a light diffusion section which is formed in a region other than a forming region of the light shielding layer on the one surface of the base material,
the light diffusion section has a light emission end surface which is in contact with the base material, a light incident end surface which is opposite to the light emission end surface and has an area greater than the area of the light emission end surface, and a reflection surface which is in contact with the light emission end surface and the light incident end surface and reflects light incident from the light incident end surface,
a height of the light diffusion section from the light incident end surface to the light emission end surface is greater than a layer thickness of the light shielding layer,
when the total width of a polar angle when luminance is reduced to ⅓ of the maximum luminance in characteristics of polar angle luminance of the illumination device is referred to as a ⅓-total width, the ⅓-total width of the illumination device is equal to or greater than 60° in the azimuthal direction in which variations in luminance of the illumination device in a polar angle direction are the greatest,
a planar shape of a portion in which the light shielding layer is in contact with the one surface of the base material is an anisotropic shape having at least a long axis and a short axis, and
a short axis direction of the light shielding layer substantially matches the azimuthal direction in which variations in transmittance in the polar angle direction are the greatest when a constant voltage is applied to the liquid crystal panel.

8. The liquid crystal display device according to claim 7, wherein the planar shape of the portion in which the light shielding layer is in contact with the one surface of the base material is elliptical or rectangular.

9. The liquid crystal display device according to claim 7, wherein the ratio B1/B2 between a length B1 in a long axis direction and a length B2 in the short axis direction in the light shielding layer is 1.1 or more and 2.5 or less.

* * * * *